(12) United States Patent
Yoshioka et al.

(10) Patent No.: US 12,489,146 B2
(45) Date of Patent: Dec. 2, 2025

(54) SOLID STATE BATTERY

(71) Applicant: Murata Manufacturing Co., Ltd., Nagaokakyo (JP)

(72) Inventors: Makoto Yoshioka, Nagaokakyo (JP); Kenji Oshima, Nagaokakyo (JP); Osamu Chikagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 711 days.

(21) Appl. No.: 17/243,766

(22) Filed: Apr. 29, 2021

(65) Prior Publication Data

US 2021/0249697 A1   Aug. 12, 2021

Related U.S. Application Data

(63) Continuation of application No. PCT/JP2019/043473, filed on Nov. 6, 2019.

(30) Foreign Application Priority Data

Nov. 16, 2018   (JP) ................... 2018-215570

(51) Int. Cl.
*H01M 10/0585* (2010.01)
*H01M 4/62* (2006.01)
(Continued)

(52) U.S. Cl.
CPC ......... *H01M 10/0585* (2013.01); *H01M 4/62* (2013.01); *H01M 10/0562* (2013.01); *H01M 50/533* (2021.01)

(58) Field of Classification Search
CPC ......... H01M 10/0585; H01M 10/0562; H01M 10/052; H01M 50/533; H01M 50/536;
(Continued)

(56) References Cited

U.S. PATENT DOCUMENTS 9,728,343 B2    8/2017   Horikawa et al.
2003/0224246 A1* 12/2003  Watanabe ........... H01M 50/258
                                                   429/211
(Continued)

FOREIGN PATENT DOCUMENTS

EP        2975671 B1    1/2018
JP     2009016188 A    1/2009
(Continued)

OTHER PUBLICATIONS

English translation of JP2012226862A—Monopolar solid state battery, laminate . . . Toyota Motor Corp; Nov. 15, 2012 (Year: 2012).*

(Continued)

*Primary Examiner* — Adam J Francis
(74) *Attorney, Agent, or Firm* — ArentFox Schiff LLP

(57) ABSTRACT

A solid state battery having: a laminated structure in which one or more positive electrode layers and one or more negative electrode layers are alternately laminated with a solid electrolytic layer interposed in between; a positive end face electrode on a first end face of the laminated structure; and a negative end face electrode on a second end face of the laminated structure, wherein (1) at least one of the one or more positive electrode layers has an end portion having a protruding shape protruding toward the positive end face electrode in a sectional view and electrically connected to the positive end face electrode, or (2) at least one of the one or more negative electrode layers has an end portion having a protruding shape protruding toward the negative end face electrode in the sectional view and electrically connected to the negative end face electrode.

14 Claims, 18 Drawing Sheets

(51) Int. Cl.
*H01M 10/0562* (2010.01)
*H01M 50/533* (2021.01)

(58) Field of Classification Search
CPC ...... H01M 50/528; H01M 4/139; H01M 4/62; H01M 4/13; H01M 2300/0068
See application file for complete search history.

(56) References Cited

U.S. PATENT DOCUMENTS

| | | | | |
|---|---|---|---|---|
| 2010/0328842 A1* | 12/2010 | Takeuchi | ............... | C25D 5/50 361/301.4 |
| 2011/0281160 A1* | 11/2011 | Doi | ............... | H01M 10/0562 429/211 |
| 2013/0017435 A1* | 1/2013 | Sato | ............... | H01M 10/0585 429/223 |
| 2013/0071762 A1* | 3/2013 | Tajima | ............... | B82Y 30/00 977/734 |
| 2013/0136973 A1* | 5/2013 | Shenoy | ............... | H01M 10/0525 429/211 |
| 2014/0106213 A1 | 4/2014 | Horikawa et al. | | |
| 2015/0214553 A1* | 7/2015 | Yoo | ............... | H01M 50/533 429/163 |
| 2018/0062212 A1 | 3/2018 | Kim et al. | | |
| 2019/0051935 A1 | 2/2019 | Okamoto et al. | | |
| 2020/0020974 A1 | 1/2020 | Shimizu et al. | | |
| 2021/0305630 A1* | 9/2021 | Ohta | ............... | H01M 50/593 |

FOREIGN PATENT DOCUMENTS

| | | | |
|---|---|---|---|
| JP | 2010176980 A | | 8/2010 |
| JP | 2011198692 A | | 10/2011 |
| JP | 2011216235 A | | 10/2011 |
| JP | 2012226862 A | * | 11/2012 |
| JP | 2014120372 A | | 6/2014 |
| JP | 2014222564 A | | 11/2014 |
| JP | 2016213105 A | | 12/2016 |
| JP | 2018166020 A | | 10/2018 |
| KR | 20180118619 A | | 10/2018 |
| WO | 2013001908 A1 | | 1/2013 |
| WO | 2018203474 A1 | | 11/2018 |

OTHER PUBLICATIONS

Japanese Office Action for corresponding JP Application No. 2020-556115, date of Japanese Office Action Dec. 7, 2021.
Written Opinion of the International Search Authority issued for PCT/JP2019/043473, date of mailing Feb. 4, 2020.
International Search Report issued for PCT/JP2019/043473, date of mailing Feb. 4, 2020.

* cited by examiner

SOLID STATE BATTERY

CROSS REFERENCE TO RELATED APPLICATIONS

The present application is a continuation of International application No. PCT/JP2019/043473, filed Nov. 6, 2019, which claims priority to Japanese Patent Application No. 2018-215570, filed Nov. 16, 2018, the entire contents of each of which are incorporated herein by reference.

FIELD OF THE INVENTION

The present invention relates to a solid state battery.

BACKGROUND OF THE INVENTION

In recent years, there has been an increase in demand for batteries used as a power source for portable electronic devices such as mobile phones and portable personal computers. Conventionally, an electrolyte (electrolyte solution) such as an organic solvent has been used as an ion transfer medium in batteries used for such purposes. However, the batteries having the above configuration involve a risk of leakage of electrolytic solution. Furthermore, the organic solvent and the like used for the electrolytic solution are flammable materials. Thus, there has been a demand for improvement in the safety of the battery.

In view of this, for the improvement of the safety of the battery, research on a solid state battery using a solid electrolyte as the electrolyte instead of the electrolytic solution has been actively conducted.

Patent Document 1 discloses an example of such a solid state battery. The solid state battery has a laminated structure with one or more positive electrode layers and one or more negative electrode layers alternately laminated with a solid electrolytic layer interposed in between, and has an end face electrode at an end face of the laminated structure.

Patent Document 1: Japanese Patent Application Laid-Open No. 2011-216235

SUMMARY OF THE INVENTION

However, the inventors of the present invention have found that the battery characteristics are deteriorated with a configuration for improving energy density of a solid state battery in which a current collector layer and a current collector (foil for example) are omitted and an electrode layer functions as an electrode and as a current collector layer or a current collector.

Specifically, FIG. 10 illustrates an example of a known solid state battery having a current collector layer and a current collector (foil for example) omitted. The solid state battery has a laminated structure with one or more positive electrode layers 101 and one or more negative electrode layers 102 alternately laminated with a solid electrolytic layer 103 interposed in between, and has end face electrodes 104 (104a, 104b) at end faces of the laminated structure. In such a solid state battery, the positive electrode layer 101 and the negative electrode layer 102 have end portions, respectively on sides of the end face electrodes 104a and 104b, having surfaces, orthogonal to the horizontal plane in sectional view, in electrical connection with the end face electrodes 104a and 104b, as illustrated in a part A' and a part B' in FIG. 10. It has been found that with this configuration, connection failure between the electrode layers 101 and 102 and the end face electrodes 104 is likely to occur, resulting in the deterioration of the battery characteristics.

In view of this, as illustrated in FIG. 11, an attempt has been made to suppress the connection failure between the electrode layers 101 and 102 and the end face electrode 104, by providing extraction portions 140 (140a and 140b) to the end face electrodes 104 (104a and 104b). Unfortunately, also with this configuration, the connection failure is still likely to occur between the electrode layers 101 and 102 and the end face electrodes 104, because end portions of the positive electrode layer 101 and the negative electrode layer 102 have end portions, respectively on sides of the end face electrodes 104a and 104b, have flat surfaces orthogonal to the horizontal plane in sectional view in electrical connection with the extraction portions 140a and 140b of the end face electrodes 104a and 104b, as illustrated in parts A' and B' in FIG. 11.

An object of the present invention is to provide a solid state battery in which connection failure between an electrode layer (that is, a positive electrode layer and/or a negative electrode layer) and an end face electrode can be more sufficiently suppressed.

The present invention relates to a solid state battery having: a laminated structure in which one or more positive electrode layers and one or more negative electrode layers are alternately laminated with a solid electrolytic layer interposed in between; a positive end face electrode on a first end face of the laminated structure; and a negative end face electrode on a second end face of the laminated structure, wherein (1) at least one of the one or more positive electrode layers has an end portion having a protruding shape protruding toward the positive end face electrode in a sectional view and electrically connected to the positive end face electrode, or (2) at least one of the one or more negative electrode layers has an end portion having a protruding shape protruding toward the negative end face electrode in the sectional view and electrically connected to the negative end face electrode.

The solid state battery of the present invention can have a structure with no current collector member, while having connection failure between an electrode layer (that is, a positive electrode layer and/or a negative electrode layer) and an end face electrode more sufficiently suppressed.

DETAILED DESCRIPTION OF THE INVENTION

[Solid State Battery]

Figure 1:
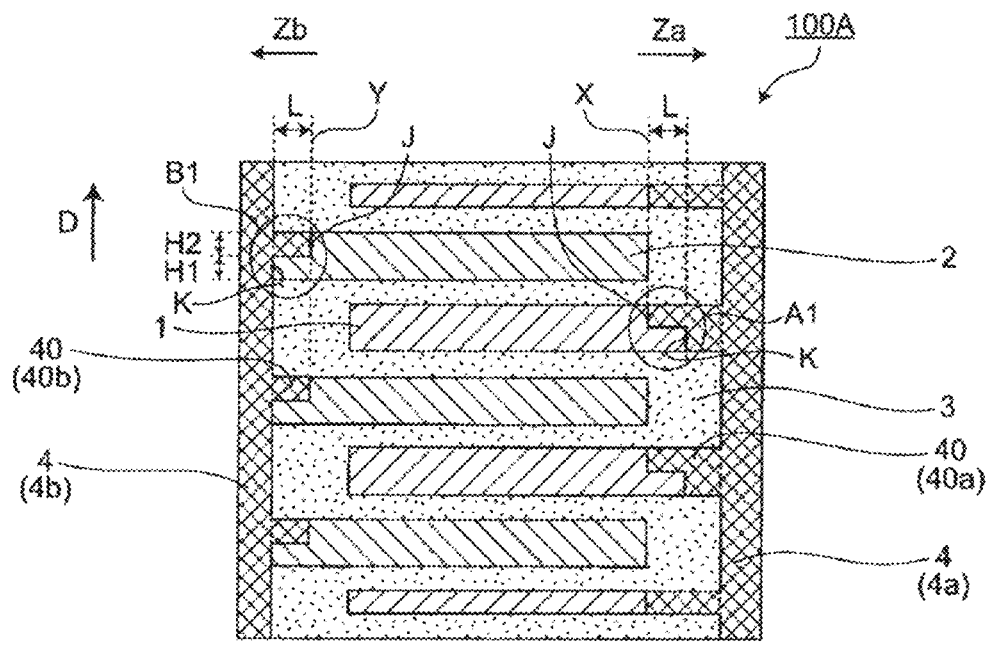
FIG. 1 is a schematic sectional view of a solid state battery according to a first embodiment of the present invention.

The present invention provides a solid state battery. The term "solid state battery" as used herein refers to, in a broad sense, a battery having components (particularly an electrolytic layer) made up of solids, and refers to, in a narrow sense, an "all-solid state battery" having (particularly all of the) components made up of solids. The term "solid state battery" as used herein includes a so-called "secondary battery" charging and discharging to and from which can be repeatedly performed, and a "primary battery" only capable of discharging. The "solid state battery" is preferably a "secondary battery". The "secondary battery" is not overly bound by its name and may also include, for example, an electrochemical device such as a "power storage device".

The term "plan view" as used herein indicates a state of a target object as viewed from above or below (top or bottom view) along a lamination direction D (or a thickness direction of the solid state battery) of layers forming the solid state battery described later. The term "sectional view" as used herein indicates a sectional state (section) as viewed in a direction substantially orthogonal to the lamination direction D (or the thickness direction of the solid state battery) of the layers forming the solid state battery. In particular, the term sectional view used for describing end portions of the positive electrode layer and the negative electrode layer on the side of the end face electrode indicates a sectional state (section) of the solid state battery taken along a plane that is in parallel with the lamination direction D and passing through the two end face electrodes (in particular, a plane in parallel with a straight line defining a distance between two end face electrodes). The terms "upward and downward direction" and "left and right direction" as used directly or indirectly herein respectively correspond to the upper and lower direction and the left and right direction in the figure. Unless otherwise specified, the same sign or symbol indicates the same member/part or the same meaning/content. In a preferred embodiment, the downward side in the vertical direction (that is, the direction in which gravity acts) corresponds to the "downward direction" and the direction opposite thereto corresponds to the "upward direction".

The solid state battery 100 of the present invention, for example, includes a layered structure (in particular, a laminated structure or a laminated structure member) denoted by "100A", "100B", "100C", "100D", "100E" and "100F" (hereinafter, may be simply referred to as "100") respectively in FIGS. 1 to 6. Specifically, in the solid state battery 100 of the present invention, one or more positive electrode layers 1 and one or more negative electrode layers 2 are alternately laminated with a solid electrolytic layer 3 interposed in between, and has end face electrodes 4 (4a and 4b) at end faces of the laminated structure. The end faces of the laminated structure are surfaces (so-called side surfaces) parallel to the lamination direction including end faces of the layers laminated. The end face electrodes 4a and 4b are generally formed on two opposite end faces of the laminated structure. The number of the positive electrode layers 1 and the negative electrode layers 2 laminated may be any number and thus is not particularly limited. The solid state battery of the present invention may have a parallel structure or a serial structure. FIGS. 1 to 6 are schematic sectional views of respective solid state batteries according to first to sixth embodiments according to the present invention.

First of all, each layer (member) of a solid state battery of the present invention will be described.

(Electrode Layer)

An electrode layer includes a positive electrode layer 1 and a negative electrode layer 2. In the solid state battery of the present invention, the electrode layer is a layer having both a battery reaction function and a current collecting function, and thus includes an active material and an electron conductive material.

The positive electrode layer 1 includes what is known as a positive electrode active material and an electron conductive material, and may further include a solid electrolyte material and/or a joining material described later. The positive electrode layer 1 is generally composed of a sintered body including positive electrode active material particles and an electron conductive material, and may be composed of a sintered body including positive electrode active material particles and electron conductive material particles as well as, if desired, solid electrolyte particles and/or a joining material.

The negative electrode layer 2 includes what is known as a negative electrode active material and an electron conductive material, and may further include a solid electrolyte material and/or a joining material described later. The negative electrode layer 2 is generally composed of a sintered body including negative electrode active material particles and an electron conductive material, and may be composed of a sintered body including negative electrode active material particles and electron conductive material particles as well as, if desired, solid electrolyte particles and/or a joining material.

The positive electrode active material included in the positive electrode layer and the negative electrode active material included in the negative electrode layer are substances involved in the transfer of electrons in the solid state battery. The charging and discharging are performed through transfer of electrons with ions included in the solid electrolyte material forming the solid electrolytic layer moving between positive electrode and negative electrode (conduction). The positive electrode layer and the negative electrode layer are preferably layers capable of occluding and releasing lithium ions or sodium ions in particular. Thus, the solid state battery of the present invention is preferably a solid state secondary battery charging and discharging of which being performed with lithium ions or sodium ions moving between the positive electrode and the negative electrode via the solid electrolytic layer.

The positive electrode active material included in the positive electrode layer is not particularly limited. Examples of such material include at least one type selected from the group consisting of a lithium-containing phosphate compound having a NASICON structure, a lithium-containing phosphate compound having an olivine structure, a lithium-containing layered oxide, a lithium-containing oxide having a spinel structure, and the like. An example of the lithium-containing phosphate compound having a NASICON structure includes $Li_3V_2(PO_4)_3$ and the like. An example of the lithium-containing phosphate compound having an olivine structure includes $LiFePO_4$, $LiMnPO_4$, and the like. An example of the lithium-containing layered oxide includes $LiCoO_2$, $LiCo_{1/3}Ni_{1/3}Mn_{1/3}O_2$, and the like. An example of the lithium-containing oxide having a spinel structure includes $LiMn_2O_4$, $LiNi_{0.5}Mn_{1.5}O_4$, and the like.

The positive electrode active material capable of occluding and releasing sodium ions includes at least one type selected from the group consisting of a sodium-containing phosphate compound having a NASICON structure, a sodium-containing phosphate compound having an olivine structure, a sodium-containing layered oxide, a sodium-containing oxide having a spinel structure, and the like.

The negative electrode active material included in the negative electrode layer is not particularly limited. Examples of such material include at least one type selected from the group consisting of an oxide including at least one element selected from the group consisting of Ti, Si, Sn, Cr, Fe, Nb, and Mo, graphite-lithium compounds, lithium alloys, a lithium-containing phosphate compound having a NASICON structure, a lithium-containing phosphate compound having an olivine structure, a lithium-containing oxide having a spinel structure, and the like. An example of the lithium alloys includes Li—Al and the like. An example of the lithium-containing phosphate compound having a NASICON structure includes $Li_3V_2(PO_4)_3$, $Li_3Fe_2(PO_4)_3$, and the like. An example of the lithium-containing oxide having a spinel structure includes $Li_4Ti_5O_{12}$ and the like.

The negative electrode active material capable of occluding and releasing sodium ions includes at least one type selected from the group consisting of a sodium-containing phosphate compound having a NASICON structure, a sodium-containing phosphate compound having an olivine structure, a sodium-containing oxide having a spinel structure, and the like.

The electron conductive material included in the positive electrode layer and the negative electrode layer is not particularly limited. Examples of such a material include: metal materials such as silver, palladium, gold, platinum, aluminum, copper, and nickel; and carbon materials. Carbon is particularly preferable because it does not easily react with the positive electrode active material, the negative electrode active material, and the solid electrolyte material, and is effective in reducing the internal resistance of the solid state battery.

The solid electrolyte material that may be contained in the positive electrode layer and the negative electrode layer may be selected from, for example, materials that are the same as solid electrolyte materials that may be included in the solid electrolytic layer described later.

The joining material that may be included in the positive electrode layer and the negative electrode layer may be selected from, for example, materials that are the same as joining materials that may be included in a joining part described later.

The positive electrode layer and the negative electrode layer may each independently further include a sintering additive. The sintering additive is not particularly limited, and for example, and may be at least one type selected from the group consisting of lithium oxide, sodium oxide, potassium oxide, boron oxide, silicon oxide, bismuth oxide, and phosphorus oxide.

The electrode layers (the positive electrode layer and the negative electrode layer) have thicknesses that are not particularly limited, and are independently, for example, 2 μm to 50 μm, preferably 5 μm to 30 μm, and even more preferably 5 μm to 20 μm for the sake of more sufficient suppression of the connection failure between the electrode layer and the end face electrode.

The total number of layers of the positive electrode layer 1 and the negative electrode layer 2 is not particularly limited, and may be, for example, 2 to 2000, and particularly 2 to 200.

(Current Collector Layer)

In the present invention, a part of the electrode layers (that is, a part of the positive electrode layer 1 and/or the negative electrode layer 2) may include a current collector layer 5. For example, in the solid state battery 100D according to the fourth embodiment illustrated in FIG. 4, the positive electrode layer 1 includes the current collector layer 5. However, preferably, all the electrode layers include no current collector layer 5, for the sake of further improvement of the energy density of the solid state battery.

The current collector layer may be in a form of a foil, but is preferably in a form of a sintered body, for the sake of reduction of a cost for manufacturing the solid state battery that can be achieved with integrated sintering and reduction of internal resistance.

If the current collector layer is in a form of a sintered body, it may be composed of, for example, a sintered body containing electron conductive material particles and a sintering additive. The electron conductive material included in the current collector layer may be selected from, for example, materials that are the same as the electron conductive materials that may be included in the electrode layer. The sintering additive included in the current collector layer may be selected from, for example, materials that are the same as the sintering additives that may be included in the electrode layer.

The thickness of the current collector layer is not particularly limited, and may be, for example, 1 µm to 5 µm, and particularly 1 µm to 3 µm.

(Solid Electrolytic Layer)

The solid electrolytic layer 3 is composed of a sintered body including solid electrolyte particles. The material of the solid electrolyte particles (that is, the solid electrolyte material) is not particularly limited as long as it can provide ions (for example, lithium ions or sodium ions) capable of moving (transmitted) between the positive electrode layer and the negative electrode layer. Examples of the solid electrolyte material include a lithium-containing phosphate compound having a NASICON structure, an oxide having a perovskite structure, an oxide having a garnet structure or the like structure, and the like. The lithium-containing phosphate compound having a NASICON structure includes $Li_xM_y(PO_4)_3$ (where $1 \leq x \leq 2$ and $1 \leq y \leq 2$ hold, and M is at least one type selected from the group consisting of Ti, Ge, Al, Ga, and Zr). An example of the lithium-containing phosphate compound having a NASICON structure includes $Li_{1.2}Al_{0.2}Ti_{1.8}(PO_4)_3$ and the like. An example of the lithium-containing oxide having a perovskite structure includes $La_{0.55}Li_{0.35}TiO_3$ and the like. An example of an oxide having a garnet or the like structure includes $Li_7La_3Zr_2O_{12}$ and the like.

Examples of the solid electrolyte through which sodium ions can be transmitted include a sodium-containing phosphate compound having a NASICON structure, an oxide having a perovskite structure, an oxide having a garnet structure or the like structure, and the like. The sodium-containing phosphate compound having a NASICON structure includes $Na_xM_y(PO_4)_3$ (where $1 \leq x \leq 2$ and $1 \leq y \leq 2$ hold, and M is at least one type selected from the group consisting of Ti, Ge, Al, Ga, and Zr).

The solid electrolytic layer may include a sintering additive. The sintering additive included in the solid electrolytic layer may be selected from, for example, materials that are the same as the sintering additives that may be included in the electrode layer.

The thickness of the solid electrolytic layer is not particularly limited, and may be, for example, 1 µm to 15 µm, and particularly 1 µm to 5 µm.

(End Face Electrode)

The end face electrode 4 is an electrode formed on the end face of the laminated structure, and generally includes positive and negative end face electrodes (4a and 4b, respectively) formed on two opposite end faces of the laminated structure. The end face electrodes 4a and 4b may be formed on a part or the entirety of the respective end faces of the laminated structure. The end face electrodes 4a and 4b are preferably formed over the entire end faces of the laminated structure, for the sake of more sufficient suppression of the connection failure between the electrode layer and the end face electrode. The end faces of the laminated structure are surfaces (so-called side surfaces) parallel to the lamination direction including end faces of the layers laminated.

The end face electrode 4 is generally composed of a sintered body including electron conductive material particles and a sintering additive. The electron conductive material included in the end face electrode 4 may be selected from, for example, materials that are the same as the electron conductive materials that may be included in the electrode layer. The sintering additive included in the end face electrode 4 may be selected from, for example, materials that are the same as the sintering additives that may be included in the electrode layer.

The thickness of the end face electrode is not particularly limited, and may be, for example, 1 µm to 20 µm, and particularly 1 µm to 10 µm.

(Joining Part)

The solid state battery 100 of the present invention may include a joining part 6 as described later. The joining part is a part responsible for joining the electrode layer and the end face electrode of the same polarity as the electrode layer with each other.

The joining part 6 is generally composed of a sintered body including a joining material. The joining material (particles for example) is inorganic particles that are when sintered while being in contact with the constituent material (particles for example) of the electrode layer and the constituent material (particles for example) of the end face electrode, likely to achieve joining at the interface between these particles. The joining material may or may not have electron conductivity and/or ionic conductivity. Examples of the joining material include quartz glass ($SiO_2$), a composite oxide glass obtained by combining $SiO_2$ with at least one selected from PbO, $B_2O_3$, MgO, ZnO, $Bi_2O_3$, $Na_2O$, $Al_2O_3$, CaO, and BaO, and the like.

In addition to the joining material, the joining part 6 may further include an electron conductive material, a solid electrolyte material, and/or a sintering additive. The electron conductive material included in the joining part 6 may be selected from, for example, materials that are the same as the electron conductive materials that may be included in the electrode layer. The solid electrolyte material included in the joining part 6 may be selected from, for example, materials that are the same as the solid electrolyte materials that may be included in the solid electrolytic layer. The sintering additive included in the joining part 6 may be selected from, for example, materials that are the same as the sintering additives that may be included in the electrode layer.

The thickness of the joining part 6 is not particularly limited, and generally may be the same thickness as the electrode layer to be joined to the end face electrode.

(More Important Characteristic Structure of Solid State Battery of Present Invention)

The solid state battery of the present invention has a structure with no current collector member. The structure with no current collector member is a structure in which at least one electrode layer of the positive electrode layer or the negative electrode layer does not have a current collector member such as a current collector layer and a current collector (for example, a foil). The "current collector member such as a current collector layer and a current collector (for example, a foil)" is a member that exclusively exerts a current collecting function without directly contributing to a battery reaction (for example, an electron generation reaction), and thus is different from the electrode layer having both the function of an electrode and the function of a current collector.

The electrode layer having a structure with no current collector member has both the function of an electrode and the function of a current collector. The electrode layer having both the function of an electrode and the function of a current collector means that the electrode layer is not only capable of implementing the battery reaction (charge/discharge reaction), but is also capable of moving or guiding the electrode generated by the reaction to the end face electrode. The electrode layers, such as a positive electrode layer and a negative electrode layer, having these functions generally include an active material and an electron conductive material, and can move the electrons to the end face electrode without requiring other members such as a current collector (such as a foil) or a current collector layer.

Figure 2:
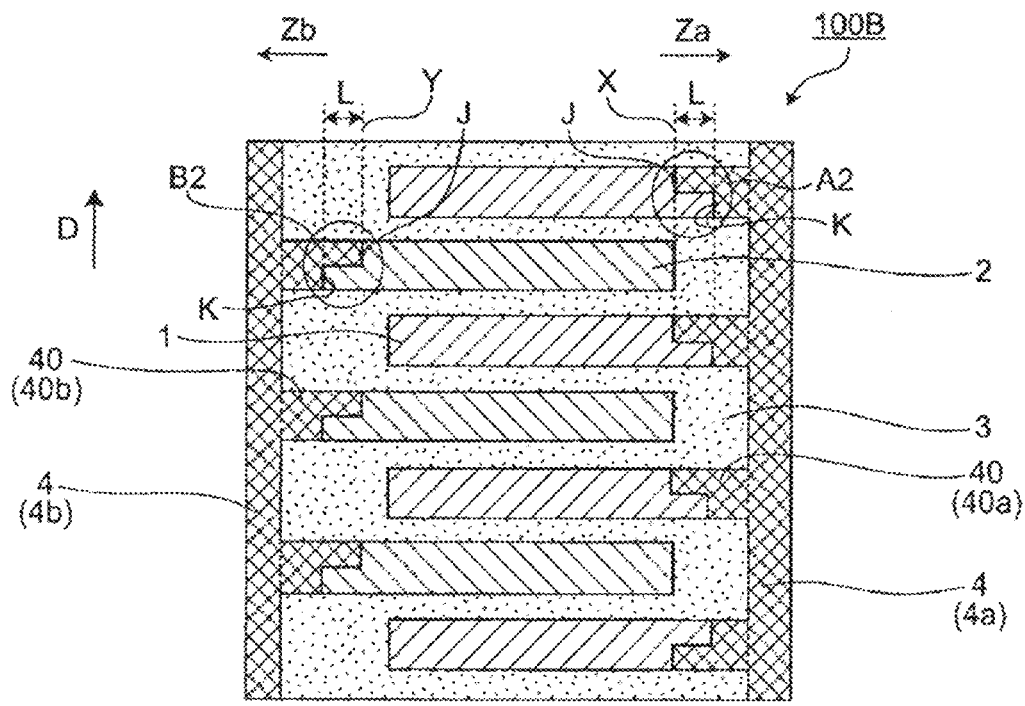
FIG. 2 is a schematic sectional view of a solid state battery according to a second embodiment of the present invention.
Figure 3:
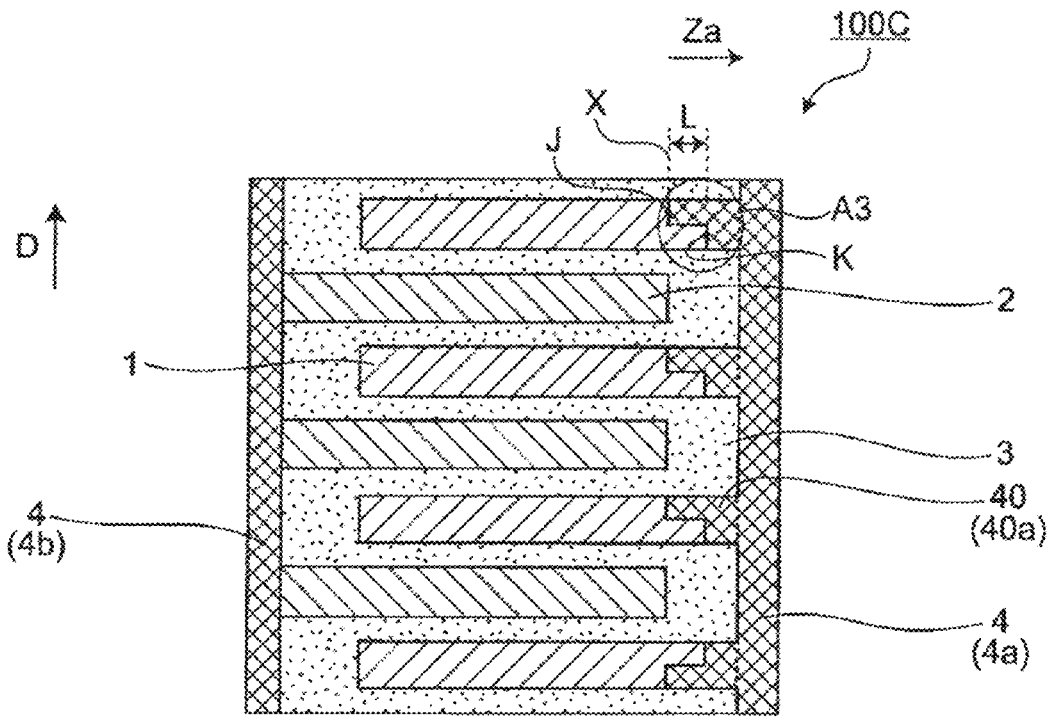
FIG. 3 is a schematic sectional view of a solid state battery according to a third embodiment of the present invention.
Figure 4:
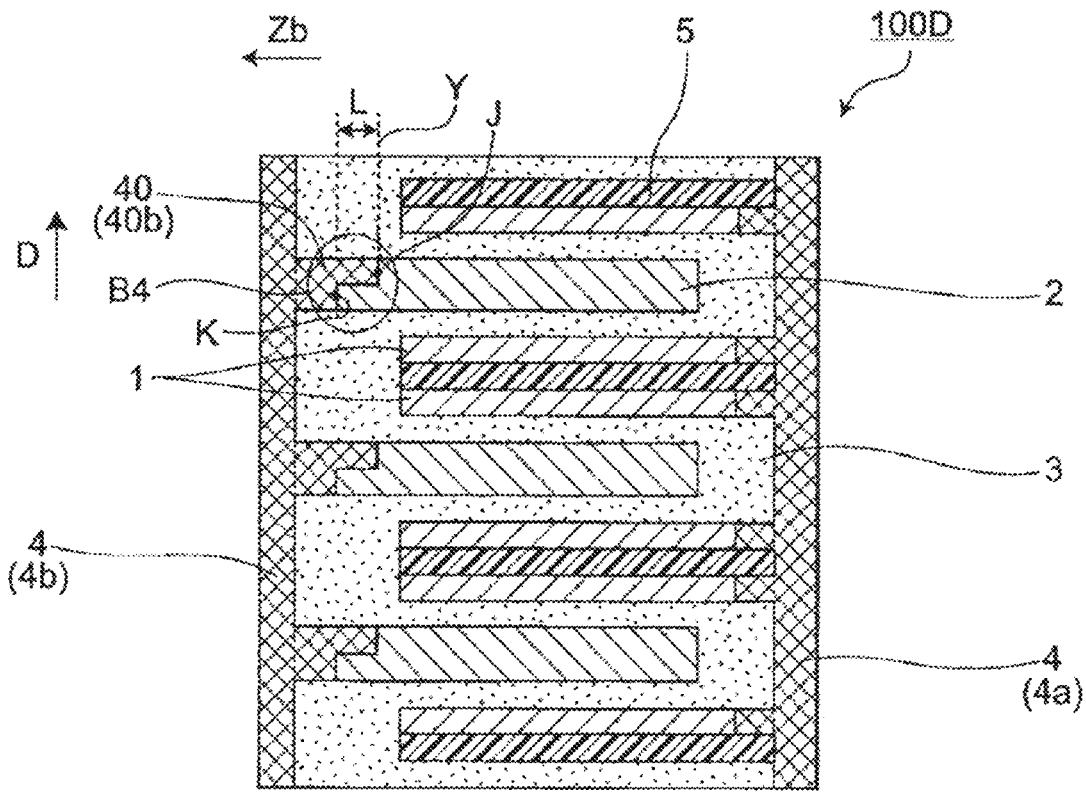
FIG. 4 is a schematic sectional view of a solid state battery according to a fourth embodiment of the present invention.
Figure 5:
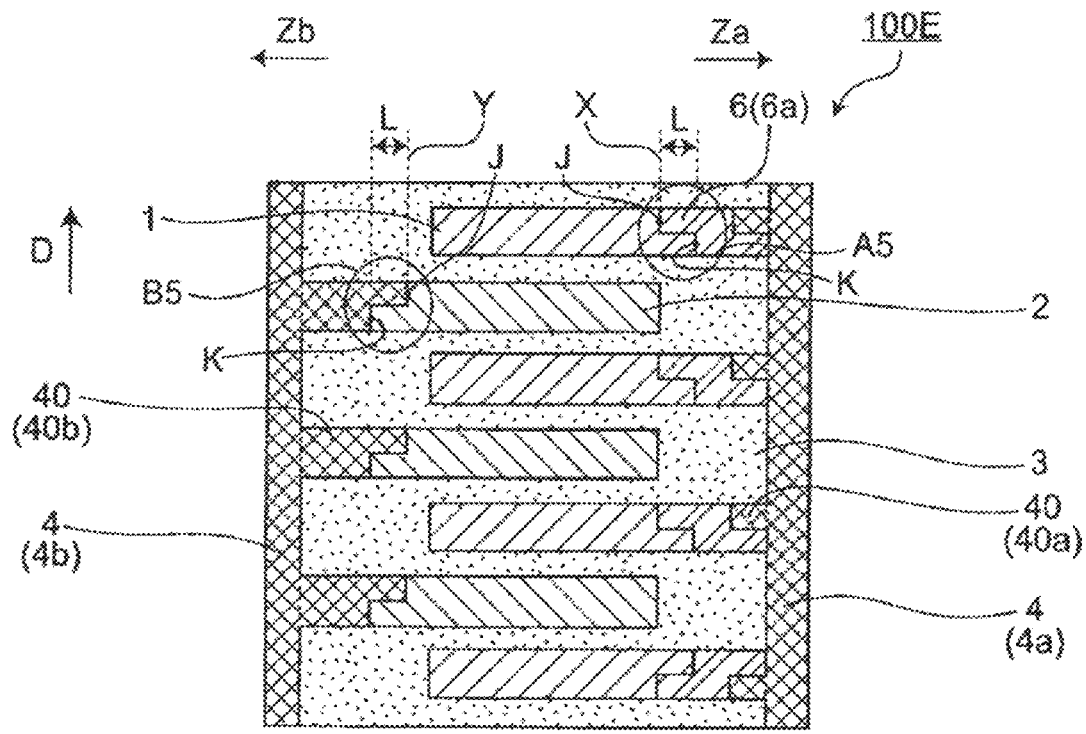
FIG. 5 is a schematic sectional view of a solid state battery according to a fifth embodiment of the present invention.

In the solid state battery of the present invention, as illustrated in FIGS. 1 to 3 and 5 and 6, both the electrode layers of the positive electrode layer 1 and the negative electrode layer 2 may have the structure with no current collector member, or as illustrated in FIG. 4, one of the electrode layers may have the structure with no current collector member. In the solid state battery according to the fourth embodiment of the present invention illustrated in FIG. 4, the negative electrode layer 2 has the structure with no current collector member, and the positive electrode layer 1 has the current collector member (for example, a current collector layer) 5. Alternatively, the negative electrode layer 2 may have a current collector member (for example, a current collector layer), and the positive electrode layer 1 may have the structure with no current collector member. In the solid state battery of the present invention, both the electrode layers of the positive electrode layer 1 and the negative electrode layer 2 preferably have the structure with no current collector member for the sake of further improvement in the energy density of the solid state battery. In the solid state battery of the present invention, both the electrode layers of the positive electrode layer 1 and the negative electrode layer 2 preferably have the structure with no current collector member and have an end portion protruding structure as described later, for the sake of more sufficient suppression of the connection failure between the electrode layer and the end face electrode and further improvement in the energy density of the solid state battery.

In the solid state battery of the present invention, at least one electrode layer of the positive electrode layer 1 or the negative electrode layer 2 (particularly, an electrode layer having a structure with no current collector member) has an end portion protruding structure as illustrated in FIGS. 1 to 6. The end portion protruding structure refers to the following structure of an electrode layer (in particular, an electrode layer having a structure with no current collector member) as illustrated in FIGS. 1 to 6. An end portion (A1 to A6 and B1 to B6) on a side of the end face electrode 4 (4a, 4b) of the same polarity as the electrode layer has a protruding shape protruding toward the end face electrode of the same polarity as the electrode layer in sectional view and is in electrical connection with the end face electrode 4a, 4b of the same polarity as the electrode layer. For example, as illustrated in FIGS. 1 to 6, the positive electrode layer 1 (in particular, the positive electrode layer 1 having the structure with no current collector member) has an end portion (A1 to A6) on the side of the positive end face electrode 4a that has a protruding shape protruding toward the positive end face electrode in sectional view, and is in electrical connection with the positive end face electrode 4a. For example, as illustrated in FIGS. 1 to 6, the negative electrode layer 2 (in particular, the negative electrode layer 2 having the structure with no current collector member) has an end portion (B1 to B6) on the side of the negative end face electrode 4b that has a protruding shape protruding toward the negative end face electrode in sectional view, and is in electrical connection with the negative end face electrode 4b.

Specifically, the end portion of the electrode layer 1, 2 has a protruding shape at the end portion (A1 to A6 and B1 to B6) on the side of the end face electrode 4 (4a, 4b) of the same polarity as the electrode layer. In sectional view, the protruding shape is protruding toward the end face electrode 4 (4a, 4b) of the same polarity as the electrode layer. For example, the positive electrode layer 1 has the end portion (A1 to A6) on the side of the positive end face electrode 4a having a protruding shape protruding toward the positive end face electrode 4a in sectional view. For example, the negative electrode layer 2 has the end portion (B1 to B6) on the side of the negative end face electrode 4b having a protruding shape protruding toward the negative end face electrode 4b in sectional view.

In sectional view, the end portion (A1 to A6 and B1 to B6) of the electrode layer 1, 2 on the side of the end face electrode 4 (4a, 4b) having the protruding shape protruding toward the end face electrode of the same polarity as the electrode layer in sectional view means that the end face of the end portion of the electrode layer is not defined by a vertical line. Specifically, the end portion (A1 to A6 and B1 to B6) of each of the electrode layers 1 and 2 on the side of the end face electrode 4 (4a, 4b) of the same polarity as the electrode layer protrudes in a direction Za, Zb of the end face electrode 4 (4a, 4b) of the same polarity as the electrode layer, with respect to a vertical line X, Y passing through a farthest point J from the end face electrode 4, among points on a line defining the end face of the end portion in sectional view as illustrated in FIGS. 1 to 6. For example, the end portion (A1 to A6) of the positive electrode layer 1 on the side of the positive end face electrode 4a protrudes toward the positive end face electrode 4a (direction Za), with respect to the vertical line X passing through the farthest point J from the end face electrode 4a, among points on a line defining the end face of the end portion in sectional view as illustrated in FIGS. 1 to 6. For example, the end portion (B1 to B6) of the negative electrode layer 2 on the side of the negative end face electrode 4b protrudes toward the negative end face electrode 4b (direction Zb), with respect to the vertical line Y passing through the farthest point J from the end face electrode 4b, among points on a line defining the end face of the end portion in sectional view as illustrated in FIGS. 1 to 6. The vertical line is a straight line that is orthogonal to the horizontal plane.

The end portion (A1 to A6 and B1 to B6) of each of the electrode layers 1 and 2 on the side of the end face electrode 4 (4a, 4b) may be in direct or indirect connection with the end face electrode 4 (4a, 4b) of the same polarity as the electrode layer. The end portion in direct connection with the end face electrode refers to an end portion in direct electrical connection with the end face electrode 4, as in the cases of the end portions A1 and B1 in FIG. 1, the end portions A2 and B2 in FIG. 2, the end portion A3 in FIG. 3, the end portion B4 in FIG. 4, and the end portion B5 in FIG. 5. The end portion in indirect connection with the end face electrode refers to an end portion in indirect electrical connection with the end face electrode 4 via the joining part 6 described later, as in the cases of the end portion A5 illustrated in FIG. 5 and the end portions A6 and B6 illustrated in FIG. 6. With the end portion of the electrode layer in indirect electrical connection with the end face electrode 4 via the joining part 6, the joining strength of the electrode layer to the end face electrode can be increased, whereby the deterioration of the battery characteristics due to joining failure can be more sufficiently suppressed. If a joining part 6a of the positive electrode layer 1 and a joining part 6b of the negative electrode layer 2 have different colors, the positive electrode layer and the negative electrode layer can be easily distinguished from each other.

If the end portion of the electrode layer such as the positive electrode layer 1 and/or the negative electrode layer 2 on the side of the end face electrode has the end portion protruding structure in the solid state battery of the present invention, the electrode layer and the end face electrode or the joining part can be joined with each other in a "complex" manner. As a result, compared with the configuration without the end portion protruding structure, the joining area between the electrode layer and the end face electrode or the joining part can be made large, so that the deterioration of the battery characteristics due to the joining failure can be more sufficiently suppressed.

The protruding shape of the end portion protruding structure of the electrode layer has a protruding length L that is generally 5 µm to 500 µm, and is preferably 10 µm to 100 µm for the sake of more sufficiently suppression of the connection failure between the electrode layer and the end face electrode. The protruding length L of the protruding shape is a length (that is, a distance), in the horizontal direction, from the farthest point J from the end face electrode among the points on the line defining the end face of the end portion to a closest point K in sectional view (see for example, FIGS. 1 to 6, FIG. 7A, FIG. 8A, and FIG. 9A).

Figure 8A:
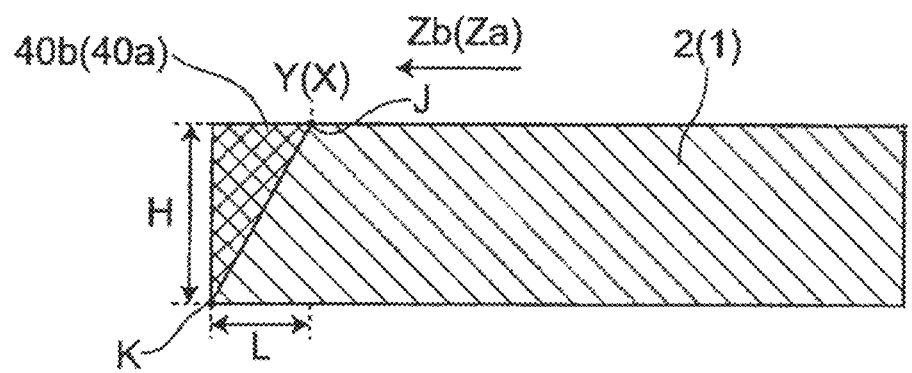
FIG. 8A is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8B:
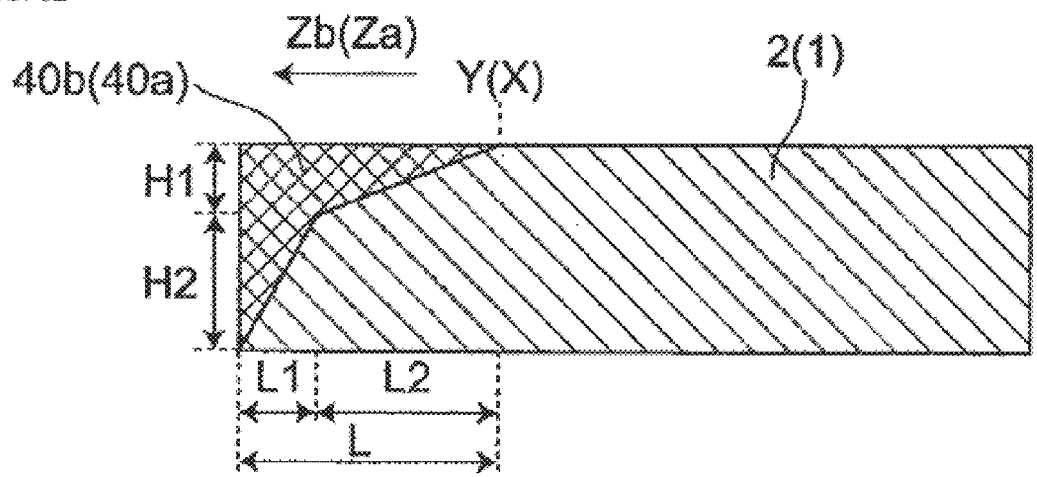
FIG. 8B is an enlarged schematic sectional view of a portion around the end portion protruding structure that may be provided to the end portion of the negative electrode layer (or the positive electrode layer) on the side of the end face electrode in the solid state battery of the present invention.
Figure 8C:
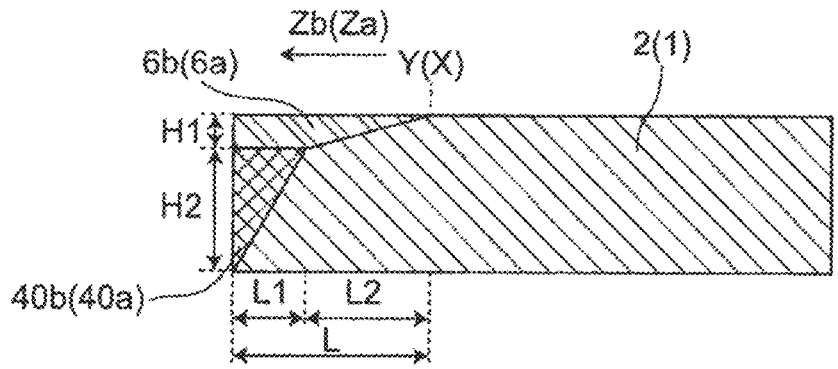
FIG. 8C is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8D:
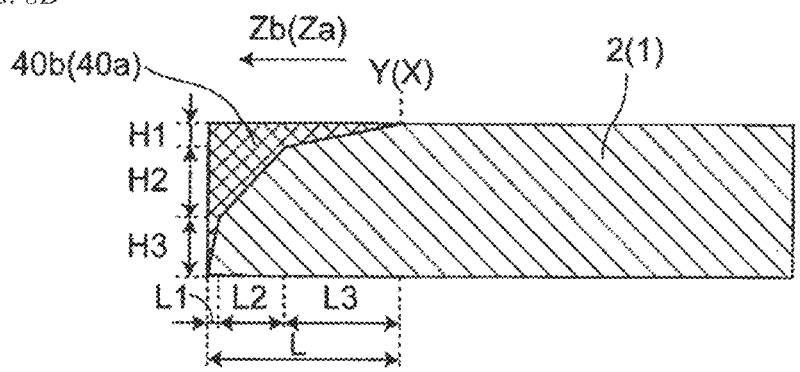
FIG. 8D is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8P:
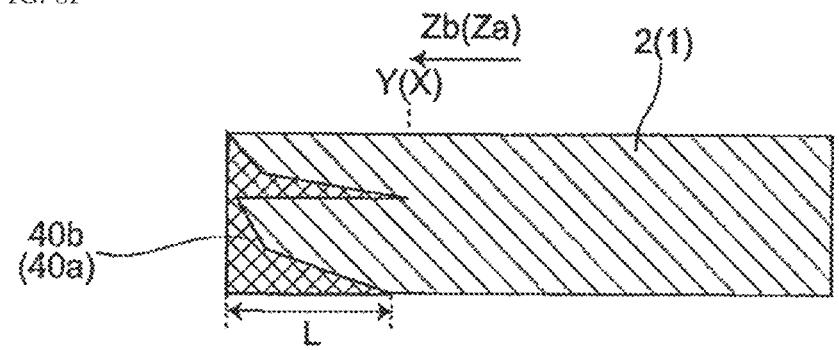
FIG. 8P is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9A:
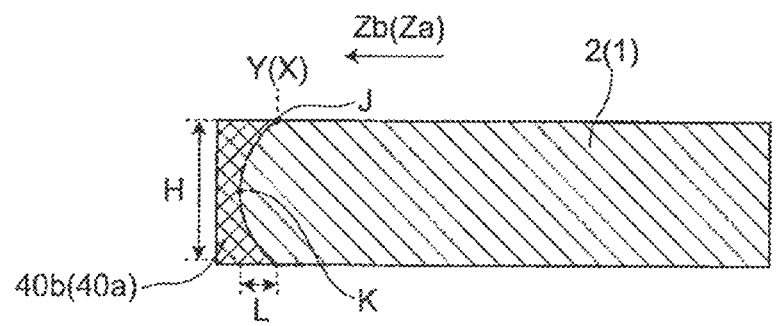
FIG. 9A is an enlarged schematic sectional view of a portion around the end portion protruding structure that may be provided to the end portion of the negative electrode layer (or the positive electrode layer) on the side of the end face electrode in the solid state battery of the present invention.
Figure 9B:
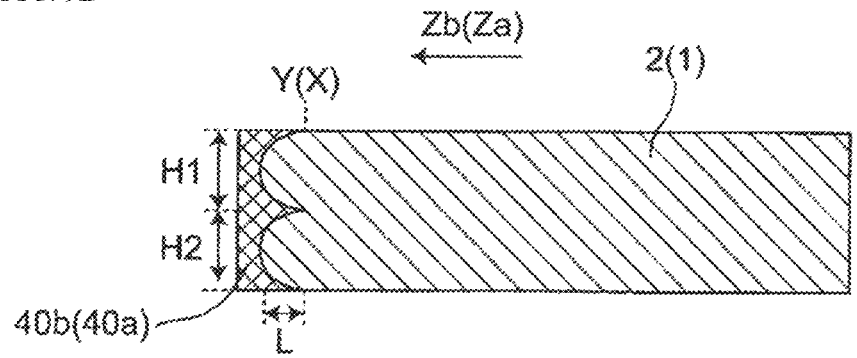
FIG. 9B is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9C:
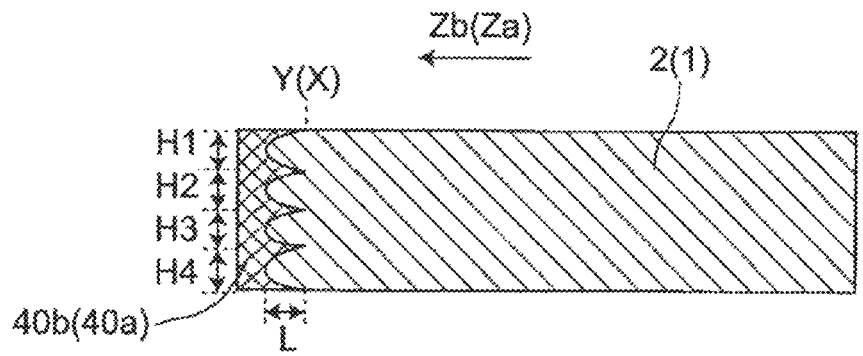
FIG. 9C is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9D:
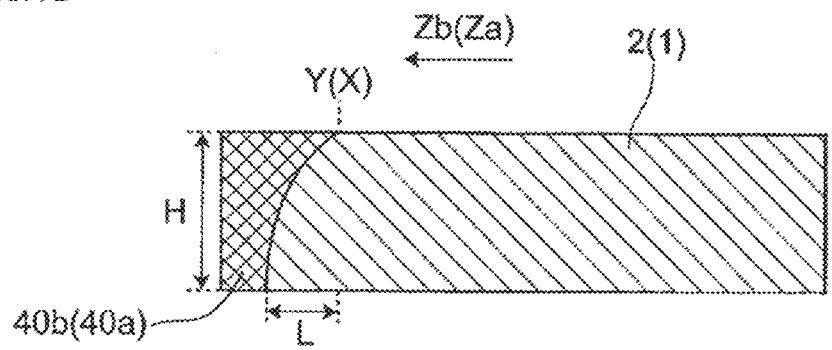
FIG. 9D is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9E:
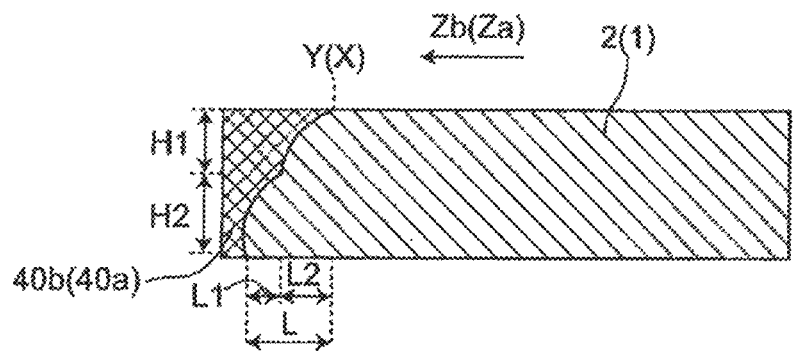
FIG. 9E is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9F:
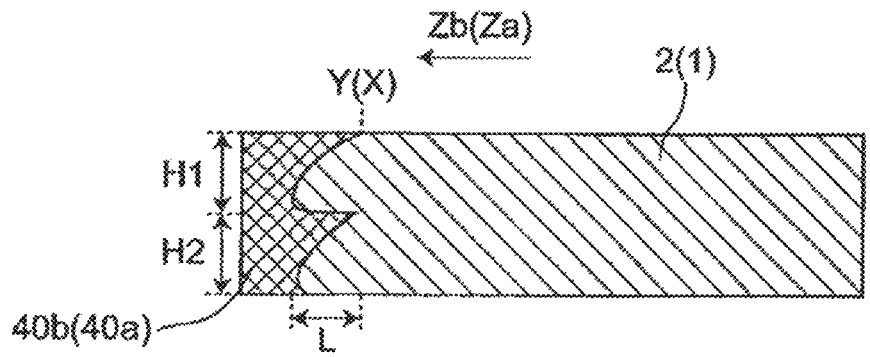
FIG. 9F is an enlarged schematic sectional view of a portion around the end portion protruding structure that may be provided to the end portion of the negative electrode layer (or the positive electrode layer) on the side of the end face electrode in the solid state battery of the present invention.
Figure 9G:
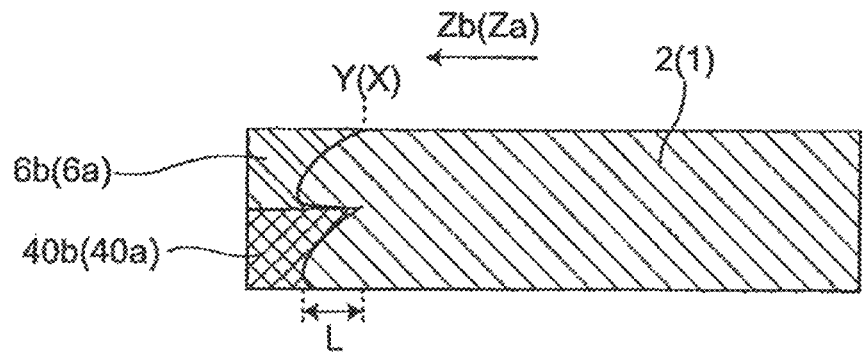
FIG. 9G is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.

The end portion protruding structure that may be provided to the electrode layer (for example, a connection surface structure between the end portion of the electrode layer 1, 2 on the side of the end face electrode and the end face electrode 4, and a connection surface structure between the end portion of the electrode layer 1, 2 on the side of the end face electrode and the joining part 6) is not particularly limited as long as the end portion has the protruding shape. For example, the end portion protruding structure that may be provided to the electrode layer 1, 2 (for example, the connection surface structure between the end portion of the electrode layer 1, 2 on the side of the end face electrode and the end face electrode 4, and the connection surface structure between the end portion of the electrode layer 1, 2 on the side of the end face electrode and the joining part 6) may be a step structure including one or more portions having a protruding shape protruding into a stepped shape as illustrated in FIGS. 1 to 6 (the end portions A1 to A6 and B1 to B6 in these figures) and in FIGS. 7A to 7T, an inclined structure including one or more portions having a linearly protruding shape as illustrated in FIGS. 8A to 8P, a curved structure including one or more portions with protruding shape protruding in a curved manner as illustrated in FIGS. 9A to 9P, or a combined structure of these. Each of FIGS. 7A to 7T, 8A to 8P, and 9A to 9P is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention. FIGS. 7A to 7T, 8A to 8P, and 9A to 9P illustrate an example of a structure in which the left side of the negative electrode layer 2 is joined to the end face electrode 4b (in particular, a complementary shape portion 40b thereof) on the negative electrode side, and also illustrates an example of a structure in which the left side of the positive electrode layer 1 is joined to the end face electrode 4a (in particular, a complementary shape portion 40a thereof) on the positive electrode side When the step structure (for example, FIGS. 1 to 6 and FIGS. 7A to 7T) has a plurality of step portions, protruding lengths (the length in the end face electrode direction Z (Za, Zb)) L1, L2, and L3 of the respective step portions may be any length, as long as the total protruding length or the maximum protruding length of all the step portions is within a range of the protruding length L described above.

Heights H, H1, H2, H3, and H4 of the step portions in the step structure (for example, FIGS. 1 to 6 and FIGS. 7A to 7T) may be any height, as long as the total height of all the step portions does not exceed the thickness of the electrode layer described later. Generally, the step portions have the respective heights H, H1, H2, H3, and H4 that are independently, for example, 1 µm to 30 µm, preferably 1 µm to 20 µm, more preferably 1 µm to 10 µm, and even more preferably 1 µm to 5 µm for the sake of more effective sufficient suppression of the connection failure between the electrode layer and the end face electrode.

When the inclined structure (for example, FIGS. 8A to 8P) has a plurality of inclined portions, protruding lengths (the length in the end face electrode direction Z (Za, Zb)) L1, L2, and L3 of the respective inclined portions may be any length, as long as the total protruding length or the maximum protruding length of all the inclined portions is within a range of the protruding length L described above.

Heights H, H1, H2, H3, and H4 of the inclined portions in the inclined structure (for example, FIGS. 8A to 8P) may be any height, as long as the total height of all the inclined portions does not exceed the thickness of the electrode layer described later. Generally, the inclined portions have the respective heights H, H1, H2, H3, and H4 that are independently, for example, 1 µm to 30 µm, preferably 1 µm to 20 µm, more preferably 1 µm to 10 µm, and even more preferably 1 µm to 5 µm for the sake of more effective sufficient suppression of the connection failure between the electrode layer and the end face electrode.

When the curved structure (for example, FIGS. 9A to 9P) has a plurality of curved portions, protruding lengths (the length in the end face electrode direction Z (Za, Zb)) L1, L2, and L3 of the respective curved portions may be any length, as long as the total protruding length or the maximum protruding length of all the curved portions is within a range of the protruding length L described above.

Heights H, H1, H2, H3, and H4 of the curved portions in the curved structure (for example, FIGS. 9A to 9P) may be any height, as long as the total height of all the curved portions does not exceed the thickness of the electrode layer described later. Generally, the curved portions have the respective heights H, H1, H2, H3, and H4 that are independently, for example, 1 µm to 30 µm, preferably 1 µm to 20 µm, more preferably 1 µm to 10 µm, and even more preferably 1 µm to 5 µm for the sake of more effective sufficient suppression of the connection failure between the electrode layer and the end face electrode.

In the solid state battery of the present invention, as illustrated in FIGS. 1 and 2 and 5 and 6, both the electrode layers of the positive electrode layer 1 and the negative electrode layer 2 (in particular, both electrode layers having the structure with no current collector member) may have the end portion protruding structure, or as illustrated in FIGS. 3 and 4, one of the electrode layers (in particular, one of the electrode layers having the structure with no current collector member) may have the end portion protruding structure. The solid state battery according to the third embodiment of the present invention illustrated in FIG. 3 has the positive electrode layer 1 provided with the end portion protruding structure, but the negative electrode layer 2 may be provided with the end portion protruding structure as in the solid state battery according to the fourth embodiment of the present invention illustrated in FIG. 4. In the solid state battery of the present invention, both the electrode layers of the positive electrode layer 1 and the negative electrode layer 2 preferably have the end portion protruding structure and more preferably has the end portion protruding structure and the structure with no current collector member, for the sake of more sufficient suppression of the connection failure between the electrode layer and the end face electrode and further improvement in the energy density of the solid state battery.

When the positive electrode layer 1 has the end portion protruding structure, the end portion protruding structure does not necessarily need to be provided to all the positive electrode layers 1, and a part of the positive electrode layers 1 (in particular, the outermost positive electrode layer 1) may not have the end portion protruding structure as illustrated in FIG. 1. The outermost positive electrode layer 1 is the uppermost positive electrode layer and/or the lowermost positive electrode layer. In the solid state battery of the present invention, all of the positive electrode layers 1 preferably have the end portion protruding structure and more preferably has the end portion protruding structure and the structure with no current collector member, for the sake of more sufficient suppression of the connection failure between the electrode layer and the end face electrode and further improvement in the energy density of the solid state battery.

When the negative electrode layers 2 has the end portion protruding structure, the end portion protruding structure does not necessarily need to be provided to all the negative electrode layers 2 as in the case of the positive electrode layer 1, and a part of the negative electrode layers 2 may not have the end portion protruding structure. In the solid state battery of the present invention, all of the negative electrode layers 2 preferably have the end portion protruding structure and more preferably has the end portion protruding structure and the structure with no current collector member, for the sake of more sufficient suppression of the connection failure between the electrode layer and the end face electrode and further improvement in the energy density of the solid state battery.

When the end portion of the electrode layer 1, 2 on the side of the end face electrode is in direct electrical connection with the end face electrode 4 (4a, 4b), the end face electrode 4 (4a, 4b) has the complementary shape portion 40 (40a, 40b) having a complementary shape for the end portion of the electrode layer on the side of the end face electrode in sectional view as illustrated in FIG. 1 and FIG. 2 for example. The complementary shape portion 40 (40a, 40b) is a member that is a part of the end face electrode 4 (4a, 4b) having a complementary shape corresponding to the end portion protruding structure (the protruding shape in particular) of the electrode layer, and is generally made of a material the same as that of the end face electrode 4. The complementary shape portion 40 (40a, 40b) of the end face electrode 4 (4a, 4b) protrudes toward the electrode layer 1, 2 having the same polarity as the end face electrode 4. Specifically, the complementary shape portion 40a of the end face electrode 4a on the positive electrode side protrudes toward the positive electrode layer 1. The complementary shape portion 40b of the end face electrode 4b on the negative electrode side protrudes toward the negative electrode layer 2. This complementary shape is a shape capable of coming into contact with or fitting with the end portion of the electrode layer 1, 2 on the side of the end face electrode (the protruding shape thereof in particular) with a clearance extremely close to 0 mm (0 mm in particular) for example. With such a complementary shape portion 40 (40a, 40b), connection and fitting between the electrode layer 1, 2 (in particular, the end portion thereof on the side of the end face electrode) and the end face electrode 4 (4a, 4b) (particularly the complementary shape portion 40 (40a, 40b) thereof) are achieved. For the sake of more sufficient suppression of the connection failure between the electrode layer and the end face electrode, the electrode layer 1, 2 (the end portion thereof on the side of the end face electrode in particular) and the end face electrode 4 (4a, 4b) (the complementary shape portion 40 (40a, 40b) in particular) are preferably sintered bodies integrally sintered. The sintered bodies integrally sintered means that two or more members adjacent to or in contact with each other are joined with each other by sintering. For the sake of more sufficient suppression of the connection failure between the electrode layer and the end face electrode, the electrode layer 1, 2 (the end portion thereof on the side of the end face electrode in particular) and the end face electrode 4 (4a, 4b) (the complementary shape portion 40 (40a, 40b) in particular) are preferably both sintered bodies that are integrally sintered.

When the end portion of the electrode layer 1, 2 on the side of the end face electrode is in direct electrical connection with the end face electrode 4 (4a, 4b), as illustrated in FIG. 1, FIG. 2, FIG. 7A, FIG. 7F, FIG. 7G, FIG. 7L, FIG. 7Q to FIG. 7T, FIG. 8A, FIG. 8B, FIG. 8D, FIG. 8F, FIG. 8G, FIG. 8I to FIG. 8L, FIG. 8N to FIG. 8P, FIG. 9A to FIG. 9F, FIG. 9I, and FIG. 9K to FIG. 9P, the entire end face of the end portion of the electrode layer 1, 2 on the side of the end face electrode is in direct electrical connection with the end face electrode 4 (4a, 4b) (the complementary shape portion 40 (40a, 40b) in particular).

The end portion of the electrode layer 1, 2 on the side of the end face electrode may be in indirect electrical connection with the end face electrode 4 (4a, 4b) via the joining part 6 (6a, 6b). With this configuration, the joining strength of the electrode layer to the end face electrode (in particular, the joining strength of the electrode layer to the end face electrode via the joining part) further increases, whereby deterioration of the battery characteristics due to joining failure between the electrode layer and the end face electrode can be more sufficiently suppressed.

Figure 6:
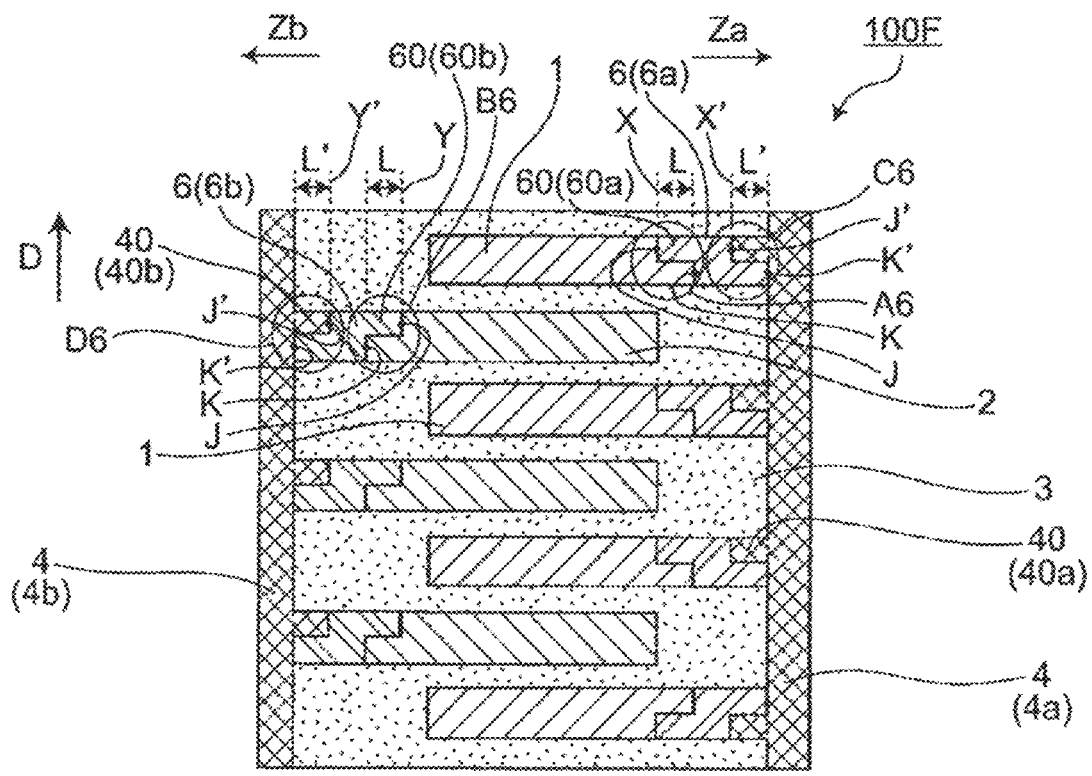
FIG. 6 is a schematic sectional view of a solid state battery according to a sixth embodiment of the present invention.
Figure 7A:
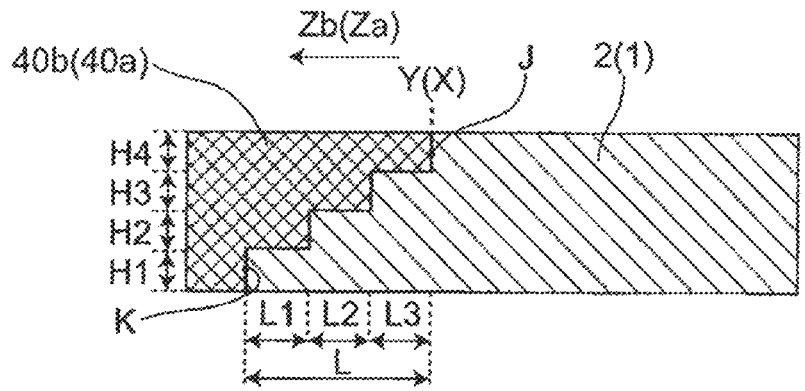
FIG. 7A is an enlarged schematic sectional view of a portion around a negative electrode layer (or a positive electrode layer) for describing an example of an end portion protruding structure that may be provided to an end portion of the negative electrode layer (or the positive electrode layer) on the side of an end face electrode in the solid state battery of the present invention.
Figure 7B:
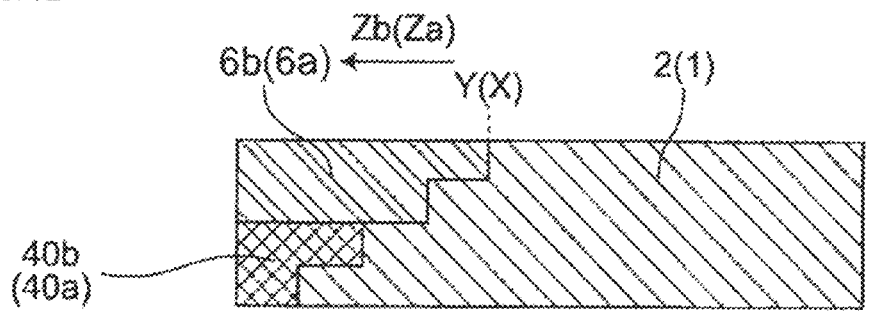
FIG. 7B is an enlarged schematic sectional view of a portion around the end portion protruding structure that may be provided to the end portion of the negative electrode layer (or the positive electrode layer) on the side of the end face electrode in the solid state battery of the present invention.
Figure 7C:
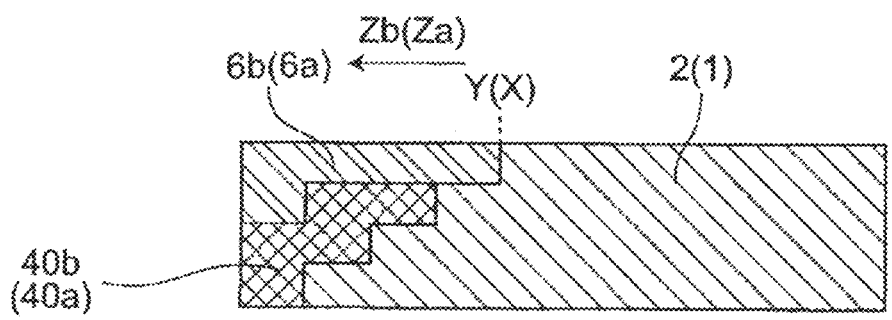
FIG. 7C is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7D:
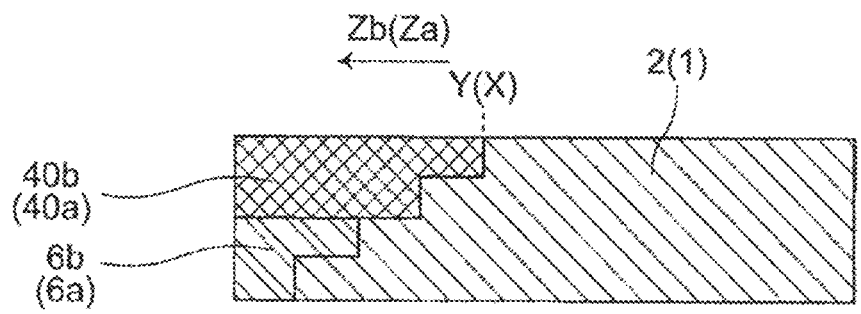
FIG. 7D is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7E:
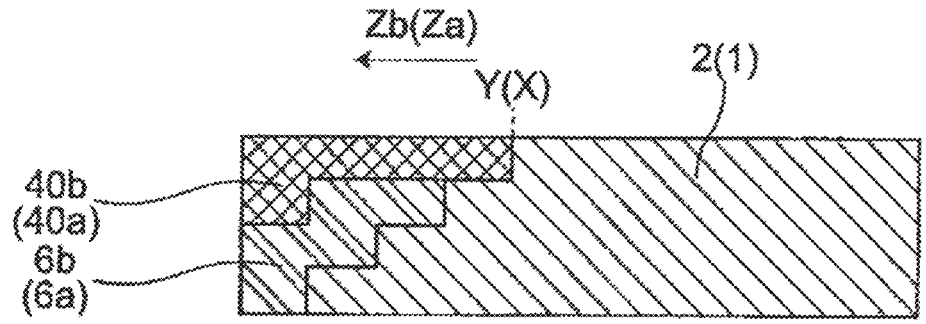
FIG. 7E is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7F:
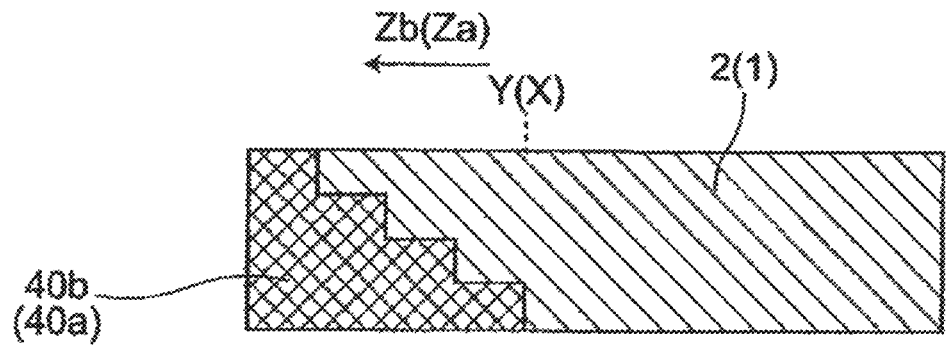
FIG. 7F is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7G:
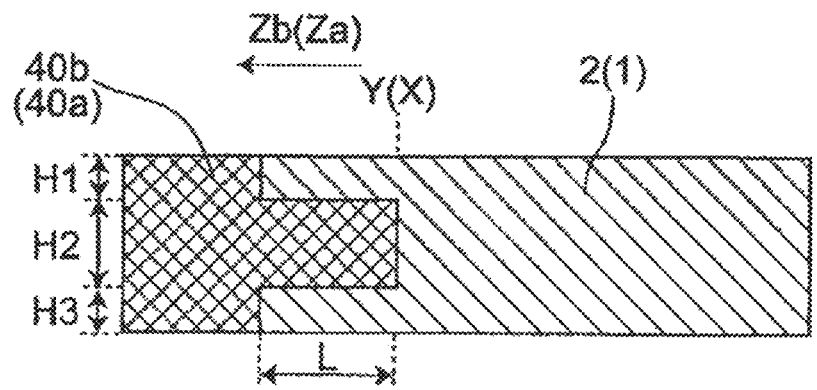
FIG. 7G is an enlarged schematic sectional view of a portion around the end portion protruding structure that may be provided to the end portion of the negative electrode layer (or the positive electrode layer) on the side of the end face electrode in the solid state battery of the present invention.
Figure 7H:
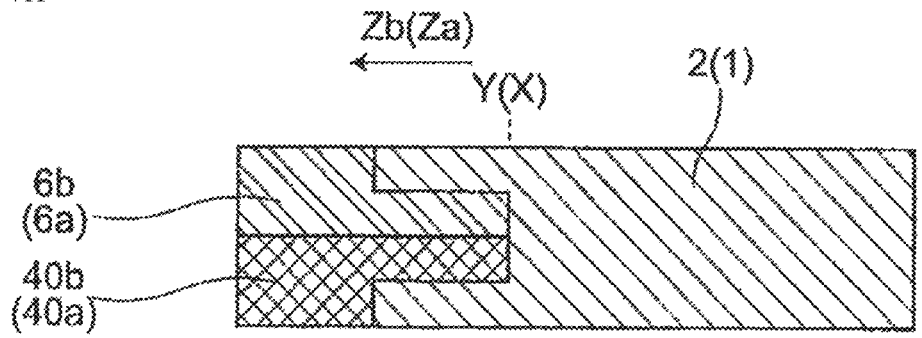
FIG. 7H is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7I:
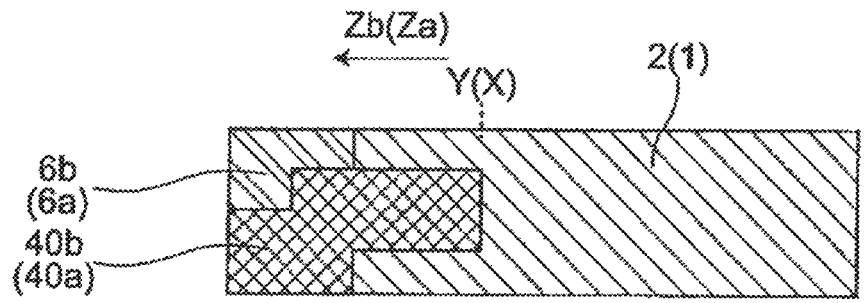
FIG. 7I is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7J:
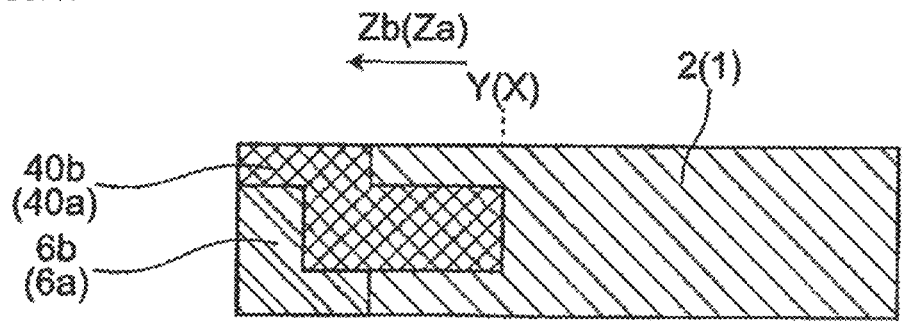
FIG. 7J is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7K:
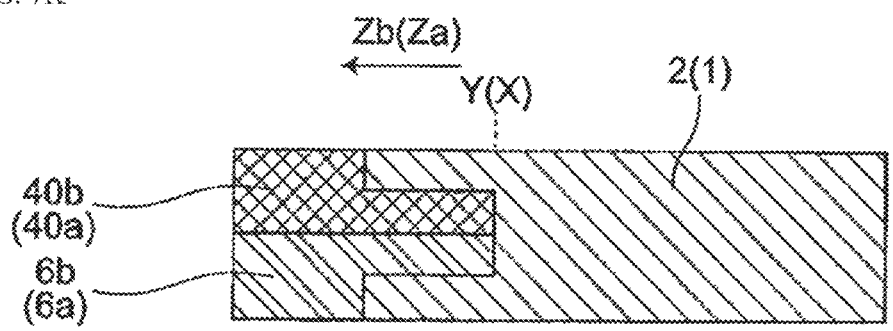
FIG. 7K is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7L:
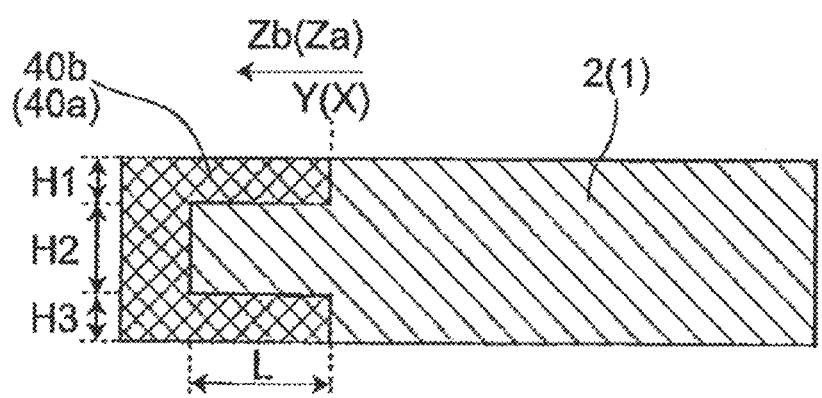
FIG. 7L is an enlarged schematic sectional view of a portion around the end portion protruding structure that may be provided to the end portion of the negative electrode layer (or the positive electrode layer) on the side of the end face electrode in the solid state battery of the present invention.
Figure 7M:
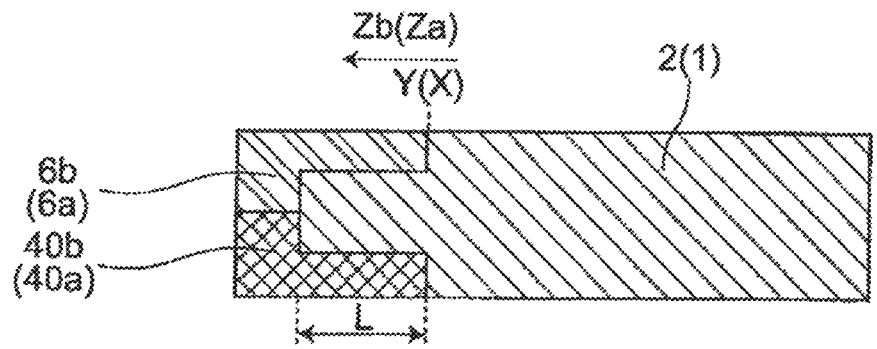
FIG. 7M is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7N:
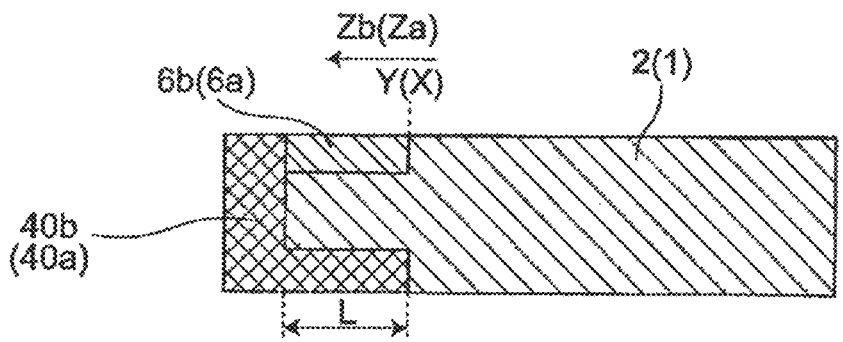
FIG. 7N is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7O:
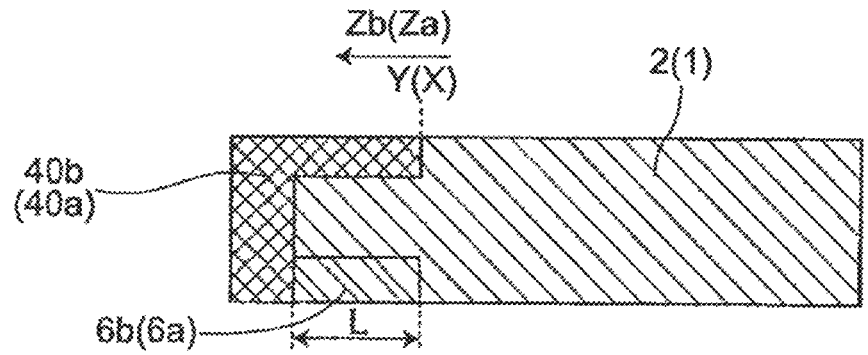
FIG. 7O is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7P:
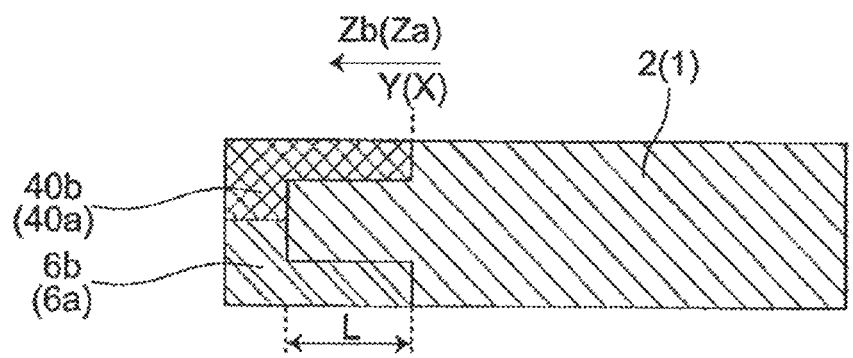
FIG. 7P is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7Q:
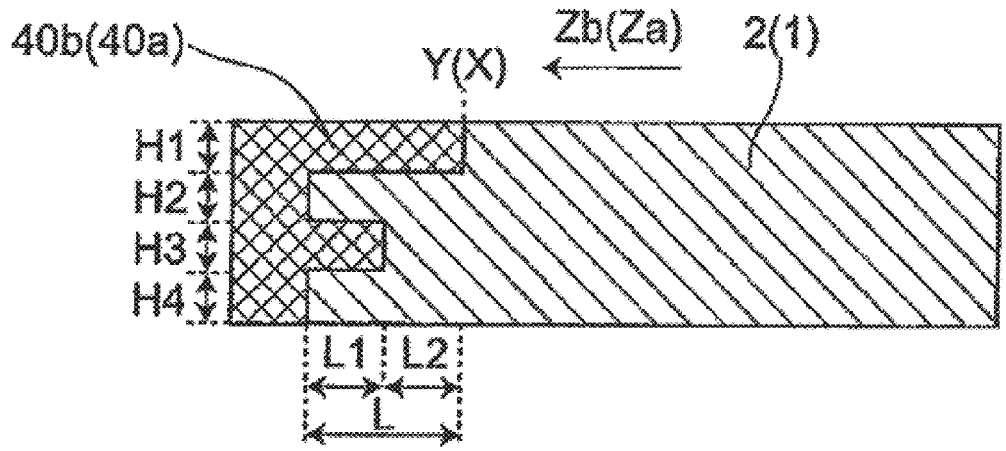
FIG. 7Q is an enlarged schematic sectional view of a portion around the end portion protruding structure that may be provided to the end portion of the negative electrode layer (or the positive electrode layer) on the side of the end face electrode in the solid state battery of the present invention.
Figure 7R:
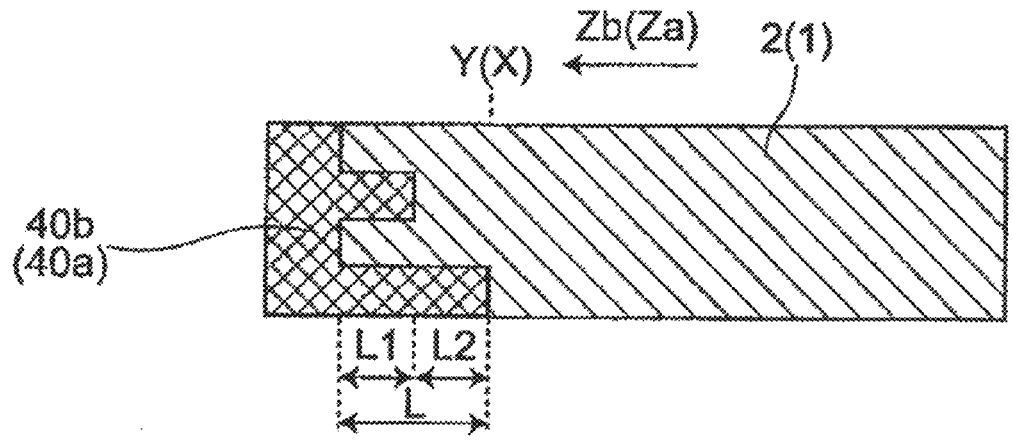
FIG. 7R is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7S:
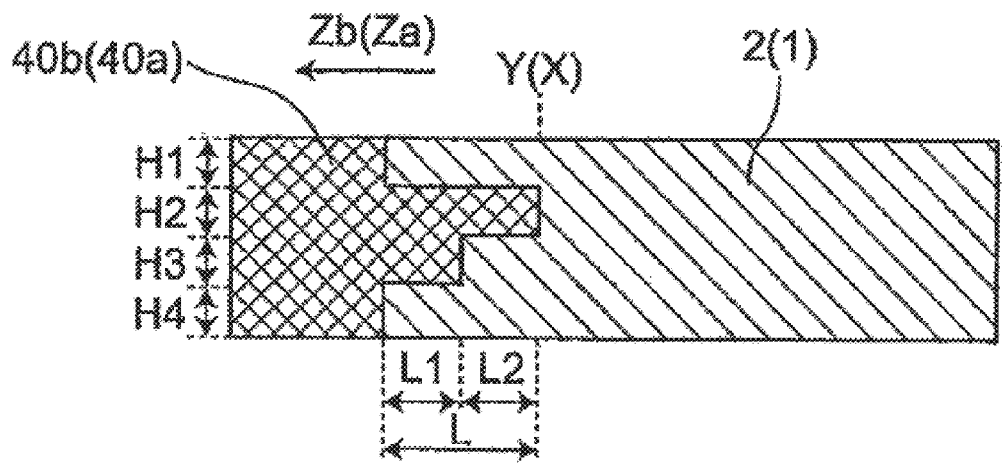
FIG. 7S is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 7T:
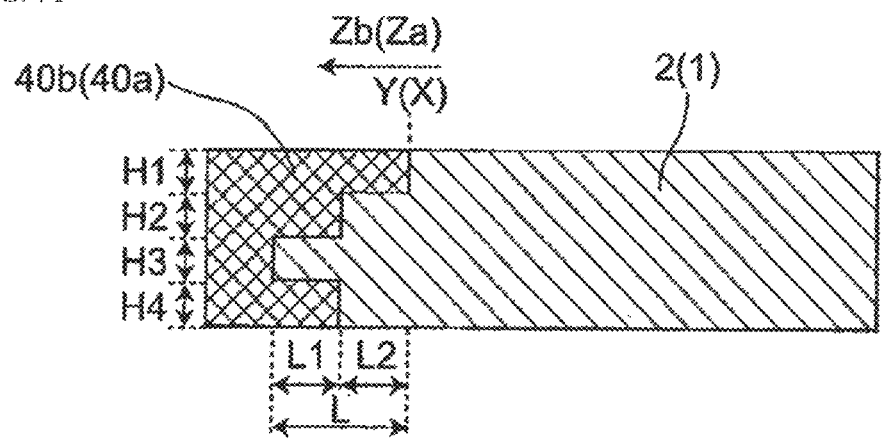
FIG. 7T is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.

When the end portion of the electrode layer 1, 2 on the side of the end face electrode is in indirect electrical connection with the end face electrode 4 (4a, 4b) via the joining part 6 (6a, 6b), the joining part 6 (6a, 6b) (the end portion thereof on the side of the electrode layer in particular) preferably has a complementary shape portion 60 (60a, 60b) having a complementary shape for the end portion of the electrode layer 1, 2 in sectional view as in FIG. 6 for example. The complementary shape portion 60 (60a, 60b) is a member that is a part of the joining part 6 (6a, 6b) having a complementary shape corresponding to the end portion protruding structure (the protruding shape in particular) of the electrode layer, and is generally made of a material the same as that of the joining part 6 (6a, 6b). The complementary shape portion 60 (60a, 60b) of the joining part 6 (6a, 6b) of each electrode layer protrudes toward the electrode layer 1, 2. Specifically, the joining part 6a of the positive electrode layer 1 protrudes toward the positive electrode layer 1, and the joining part 6b of the negative electrode layer 2 protrudes toward the negative electrode layer 2. The complementary shape of the complementary shape portion 60 (60a, 60b) is a shape capable of coming into contact with or fitting with the end portion of the electrode layer 1, 2 on the side of the end face electrode (the protruding shape thereof in particular) with a clearance extremely close to 0 mm (0 mm in particular), for example. With such a complementary shape portion 60 (60a, 60b), connection and fitting between the electrode layer 1, 2 (in particular, the end portion thereof on the side of the end face electrode) and the joining part 6 (6a, 6b) (particularly the complementary shape portion 60 (60a, 60b) thereof) are achieved. The electrode layer 1, 2 (the end portion thereof on the side of the end face electrode in particular) and the joining part 6 (6a, 6b) (the complementary shape portion 60 (60a, 60b) in particular) are preferably sintered bodies integrally sintered. The sintered bodies integrally sintered means that two or more members adjacent to or in contact with each other are joined with each other by sintering. The electrode layer 1, 2 (the end portion thereof on the side of the end face electrode in particular) and the joining part 6 (6a, 6b) (the complementary shape portion 60 (60a, 60b) in particular) are preferably sintered bodies integrally sintered. Generally, the joining part 6 is made of a material that is different from constituent materials of the electrode layer (the positive electrode layer 1 and/or the negative electrode layer 2) and the end face electrode 4. For example, the joining part 6 is made of a constituent material with the type and/or blending ratio different from those of the constituent materials of the positive electrode layer 1, the negative electrode layer 2, and the end face electrode 4 (and the solid electrolytic layer 3).

As illustrated in FIG. 6, the joining part 6 (6a, 6b) has the end portion, on the side of the end face electrode, provided with the end portion protruding structure (that is, the end portion, on the side opposite to the complementary shape portion 60 (60a, 60b), of the joining part in the horizontal direction in sectional view). The end portion protruding structure of the joining part is similar to the end portion protruding structure of the electrode layer, and is a structure in which, as illustrated in FIG. 6, the joining part 6 has the end portion (C6 and D6) on the side of the end face electrode 4 (4a, 4b) having a protruding shape protruding toward the end face electrode in sectional view and being in electrical connection with the end face electrode 4a, 4b. Specifically, as illustrated in FIG. 6, the joining part 6 (6a, 6b) of the electrode layer 1, 2 has a protruding shape at the end portion (C6 and D6) on the side of the end face electrode 4 (4a, 4b) of the same polarity as the electrode layer. In sectional view, the protruding shape is protruding toward the end face electrode of the same polarity as the electrode layer. For example, as illustrated in FIG. 6, the joining part 6a of the positive electrode layer 1 has the end portion (C6) on the side of the positive end face electrode 4a having a protruding shape protruding toward the positive end face electrode 4a in sectional view. For example, as illustrated in FIG. 6, the joining part 6b of the negative electrode layer 2 has the end portion (D6) on the side of the negative end face electrode 4b having a protruding shape protruding toward the negative end face electrode 4b in sectional view.

In the joining part 6 of each electrode layer, the end face of the end portion on the side of the end face electrode of the same polarity as the electrode layer is not defined by a vertical line in sectional view. Specifically, for example, the end portion C6 of the joining part 6a of the positive electrode layer 1 on the side of the positive end face electrode 4a protrudes toward the positive end face electrode 4a (direction Za), with respect to the vertical line X' passing through the farthest point J' from the end face electrode 4a, among points on a line defining the end face of the end portion in sectional view as illustrated in FIG. 6. For example, the end portion D6 of the joining part 6b of the negative electrode layer 2 on the side of the negative end face electrode 4b protrudes toward the negative end face electrode 4b (direction Zb), with respect to the vertical line Y' passing through the farthest point J' from the end face electrode 4b, among points on a line defining the end face of the end portion in sectional view as illustrated in FIG. 6.

The end portions (C6 and D6) of the respective joining parts 6 (6a and 6b) on the side of the end face electrodes 4 (4a and 4b) are in direct connection with the end face electrodes 4 (4a and 4b). The end portion in direct connection with the end face electrode refers to an end portion in direct electrical connection with the end face electrode 4, as in the cases of the end portions C6 and D6 illustrated in FIG. 6.

With the joining part 6 (6a, 6b) having the end portion protruding structure provided to the end portion on the side of the end face electrode, the joining part 6 (6a, 6b) can be joined with the end face electrode in a "complex" manner. As a result, compared with the configuration without the end portion protruding structure, the joining are between the end face electrode and the joining part can be made large. Thus, the electrode layer and the end face electrode are rigidly connected to each other via the joining part, whereby the deterioration of the battery characteristics due to the joining failure can be more sufficiently suppressed.

The protruding length L' of the protruding shape of the end portion protruding structure of the joining part 6 (6a, 6b) may be within a range similar to that of the protruding length L, independently from the protruding length L of the protruding shape of the end portion protruding structure of the electrode layer described above. The protruding length L' is generally 5 μm to 500 μm, and is preferably 10 μm to 100 μm for the sake of more sufficiently suppression of the connection failure between the electrode layer and the end face electrode. The protruding length L' of the protruding shape is a length (that is, a distance), in the horizontal direction, from the farthest point J' from the end face electrode among the points on the line defining the end face of the end portion to a closest point K' in sectional view (see for example, FIG. 6).

The end portion protruding structure that may be provided to the joining part 6 (6a, 6b) (for example, a connection surface structure between the end portion of the joining part 6 (6a, 6b) on the side of the end face electrode and the end face electrode 4) is not particularly limited as long as the end portion has the protruding shape. For example, the end portion protruding structure that may be provided to the joining part 6 (6a, 6b) (for example, the connection surface structure between the end portion of the joining part 6 (6a, 6b) on the side of the end face electrode and the end face electrode 4) may be a step structure including one or more portions having a protruding shape protruding into a stepped shape as illustrated in FIG. 6 (the end portions C6 and D6 in this figure), an inclined structure including one or more portions having a linearly protruding shape, a curved structure including one or more portions with a protruding shape protruding in a curved manner, or a combined structure of these, as in the case of the end portion protruding structure of the electrode layer described above.

In the end portion protruding structure of the joining part 6 (6a, 6b), each of the protruding length and height of each step portion in the step structure, the protruding length and height of each inclined portion in the inclined structure, and the protruding length and height of each curved portion in the curved structure may be the same as that in the end portion protruding structure of the electrode layer 1, 2.

When the end portion of the electrode layer 1, 2 on the side of the end face electrode is in indirect electrical connection with the end face electrode 4 (4a, 4b) via the joining part 6 (6a, 6b) and when the end portion of the joining part 6 on the side of the end face electrode has the end portion protruding structure, the end face electrode 4 (4a, 4b) has the complementary shape portion 40 (40a, 40b) having a complementary shape for the end portion of the joining part 6 (6a, 6b) on the side of the end face electrode, in sectional view as illustrated in FIG. 6 for example. The complementary shape portion 40 (40a, 40b) is a member that forms a part of the end face electrode 4 (4a, 4b) and has a complementary shape corresponding to the end portion protruding structure (particularly the protruding shape) of the joining part 6, and is generally made of the same material as the end face electrode 4. The complementary shape portion 40 (40a, 40b) of the end face electrode 4 (4a, 4b) protrudes toward the electrode layer 1, 2 (that is, toward the joining part 6) having the same polarity as the end face electrode 4. Specifically, the complementary shape portion 40a of the end face electrode 4a on the positive electrode side protrudes toward the positive electrode layer 1. The complementary shape portion 40b of the end face electrode 4b on the negative electrode side protrudes toward the negative electrode layer 2. This complementary shape of the complementary shape portion is a shape capable of fitting with the end portion of the joining part 6 on the side of the end face electrode (the protruding shape thereof in particular) with a clearance extremely close to 0 mm (0 mm in particular), for example. With such a complementary shape portion 40 (40a, 40b), connection and fitting between the joining part 6 (in particular, the end portion thereof on the side of the end face electrode) and the end face electrode 4 (4a, 4b) (particularly the complementary shape portion 40 (40a, 40b) thereof) are achieved. For the sake of more sufficient suppression of the connection failure between the electrode layer and the end face electrode, the electrode layer 1, 2 (the end portion thereof on the side of the end face electrode in particular) and the joining part 6 (6a, 6b) (the complementary shape portion 60 (60a, 60b) thereof in particular) are preferably sintered bodies integrally sintered. The sintered bodies integrally sintered means that two or more members adjacent to or in contact with each other are joined with each other by sintering. For the sake of more sufficient suppression of the connection failure between the electrode layer and the end face electrode, the electrode layer 1, 2 (the end portion thereof on the side of the end face electrode in particular) and the joining part 6 (6a, 6b) (the complementary shape portion 60 (60a, 60b) in particular) are preferably both sintered bodies that are integrally sintered. For the sake of more sufficient suppression of the connection failure between the electrode layer and the end face electrode, the electrode layer 1, 2 (the end portion thereof on the side of the end face electrode in particular) and the joining part 6 (6a, 6b) (the complementary shape portion 60 (60a, 60b) thereof in particular) and the end face electrode 4 (4a, 4b) (the complementary shape portion 40 (40a, 40b) thereof in particular) are more preferably sintered bodies integrally sintered. For the sake of more sufficient suppression of the connection failure between the electrode layer and the end face electrode, the electrode layer 1, 2 (the end portion thereof on the side of the end face electrode in particular), the joining part 6 (6a, 6b) (the complementary shape portion 60 (60a, 60b) in particular), and the end face electrode 4 (4a, 4b) (the complementary shape portion 40 (40a, 40b) in particular) are more preferably both sintered bodies that are integrally sintered.

When the end portion of the electrode layer 1, 2 on the side of the end face electrode is in indirect electrical connection with the end face electrode 4 (4a, 4b) via the joining part 6 (6a, 6b), the entire end face of the end portion of the electrode layer 1, 2 on the side of the end face electrode is in direct electrical connection with the joining part 6 (6a, 6b) (the complementary shape portion 60 (60a, 60b) in particular) as illustrated in FIG. 6. In this case, the joining part includes an electron conductive material as well as a joining material. The joining part may further include a constituent material of the electrode layer and/or a constituent material of the end face electrode. With the entire end face of the end portion of the electrode layer 1, 2 on the side of the end face electrode in direct electrical connection with the joining part 6, the joining strength of the electrode layer to the end face electrode (in particular, the joining strength of the electrode layer to the end face electrode via the joining part) further increases, whereby deterioration of the battery characteristics due to joining failure between the electrode layer and the end face electrode can be more sufficiently suppressed.

When the end portion of the electrode layer 1, 2 on the side of the end face electrode is in indirect electrical connection with the end face electrode 4 (4a, 4b) via the joining part 6 (6a, 6b), as illustrated in FIG. 7B to FIG. 7E, FIG. 7H to FIG. 7K, FIG. 7M to FIG. 7P, FIG. 8C, FIG. 8E, FIG. 8H, FIG. 8M, FIG. 9G, FIG. 9H, and FIG. 9J, a part of an end face of the end portion of the electrode layer 1, 2 on the side of the end face electrode may be in direct electrical connection with the joining part 6 (6a, 6b) (the complementary shape portion 60 (60a, 60b) thereof in particular) and the remaining part of the end face of the end portion may be in direct electrical connection with the end face electrode 4 (4a, 4b) (the complementary shape portion 40 (40a, 40b) in particular). In this case, the joining part includes a joining material, and may or may not further include an electron conductive material. The joining part may include a constituent material of the electrode layer and/or a constituent material of the end face electrode. With a part of the end face of the end portion of the electrode layer 1, 2 on the side of the end face electrode being in direct electrical connection with the joining part 6 and with the remaining part of the end face being in direct electrical connection with the end face electrode 4, an effect of improving the joining strength of the electrode layer to the end face electrode (in particular, the joining strength of the electrode layer to the end face electrode via the joining part) and an effect of facilitating the smoother movement of electrons can be achieved in a well-balanced manner. Specifically, not only the joining strength of the electrode layer to the end face electrode (particularly, the joining strength of the electrode layer to the end face electrode via the joining part) is further increased, but also electrons can be moved more smoothly. As a result of these, the deterioration of the battery performance due to the joining failure between the electrode layer and the end face electrode can be more sufficiently suppressed, and the current collecting function of the electrode layer can be more sufficiently improved.

Figure 8E:
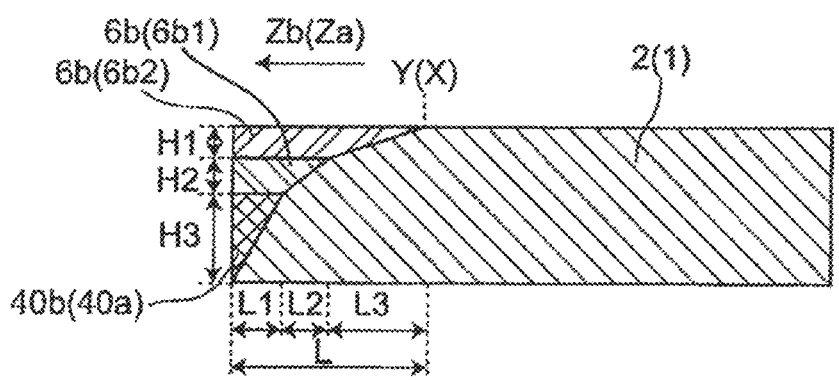
FIG. 8E is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8F:
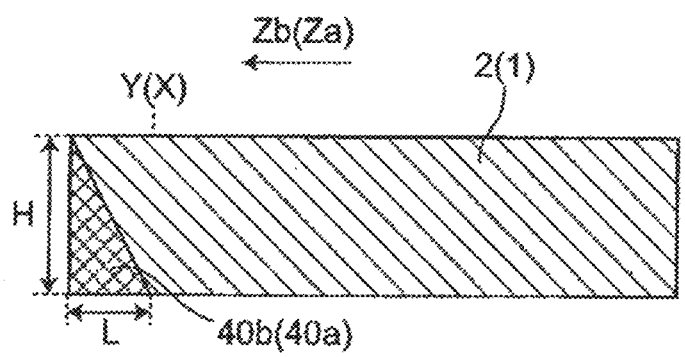
FIG. 8F is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8G:
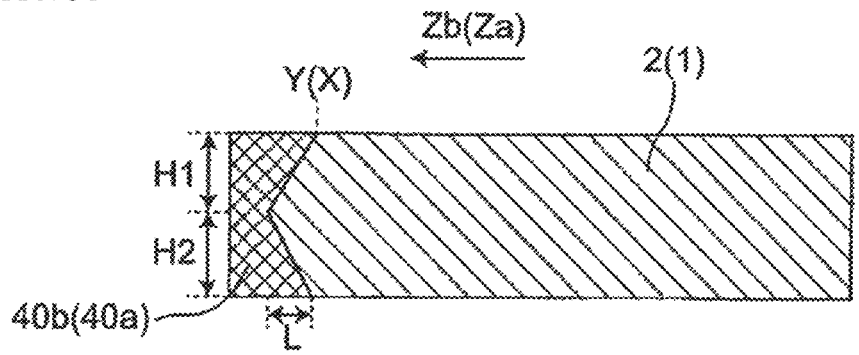
FIG. 8G is an enlarged schematic sectional view of a portion around the end portion protruding structure that may be provided to the end portion of the negative electrode layer (or the positive electrode layer) on the side of the end face electrode in the solid state battery of the present invention.
Figure 8H:
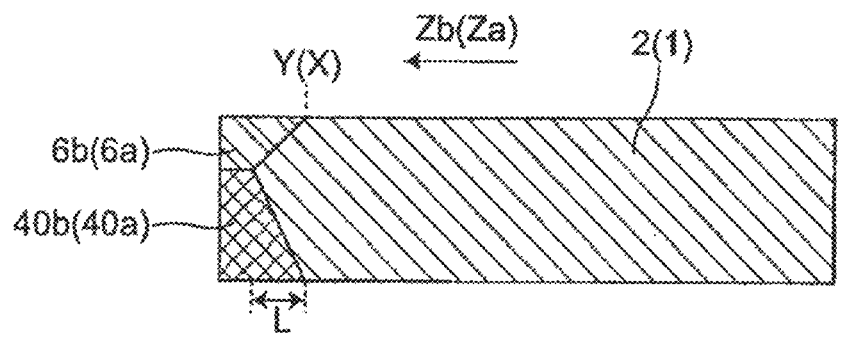
FIG. 8H is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8I:
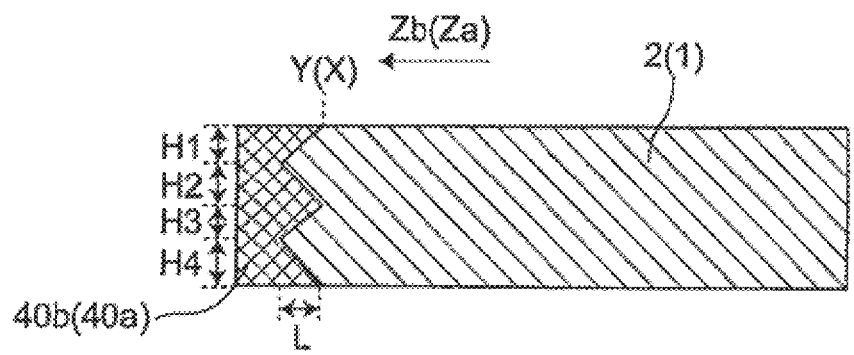
FIG. 8I is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8J:
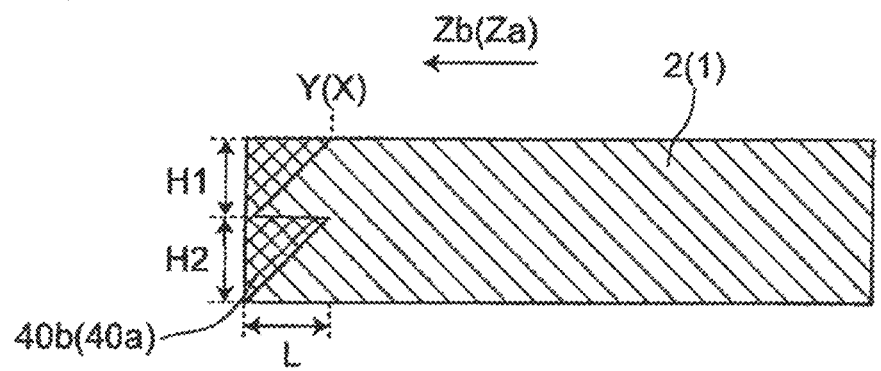
FIG. 8J is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8K:
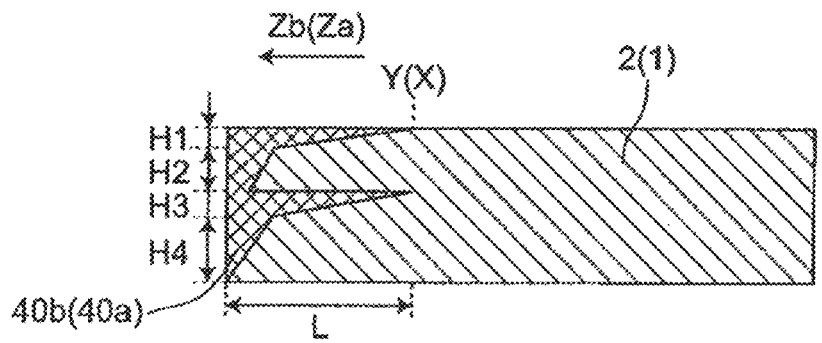
FIG. 8K is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8L:
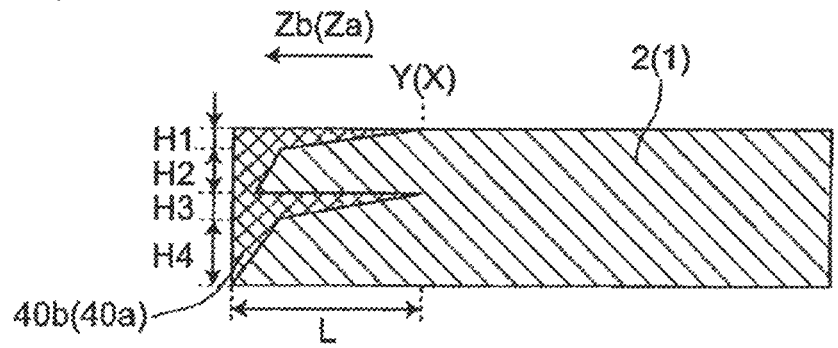
FIG. 8L is an enlarged schematic sectional view of a portion around the end portion protruding structure that may be provided to the end portion of the negative electrode layer (or the positive electrode layer) on the side of the end face electrode in the solid state battery of the present invention.
Figure 8M:
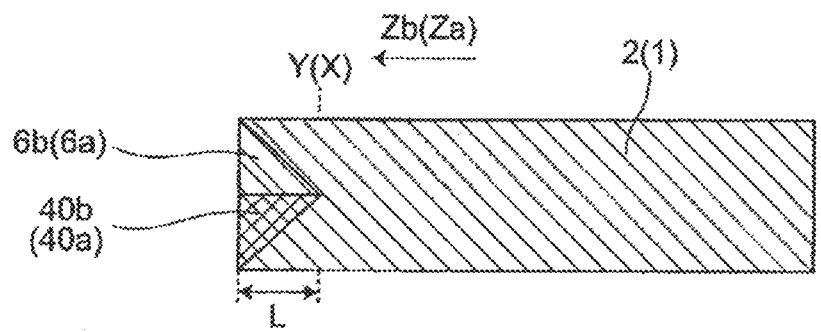
FIG. 8M is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8N:
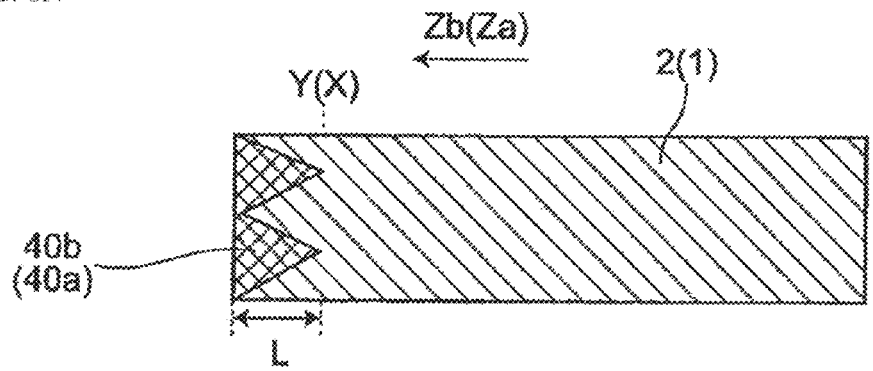
FIG. 8N is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 8O:
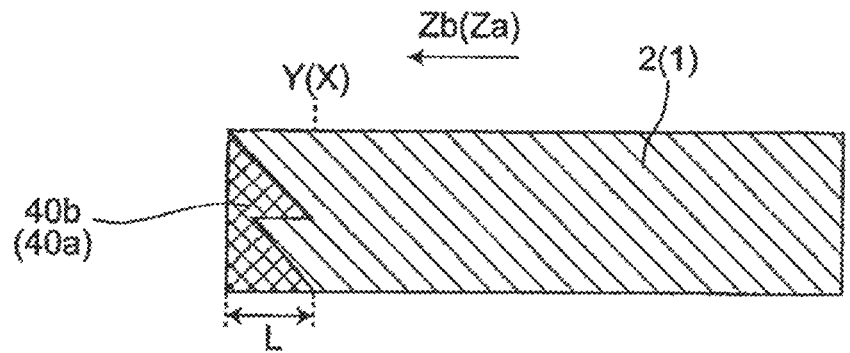
FIG. 8O is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9H:
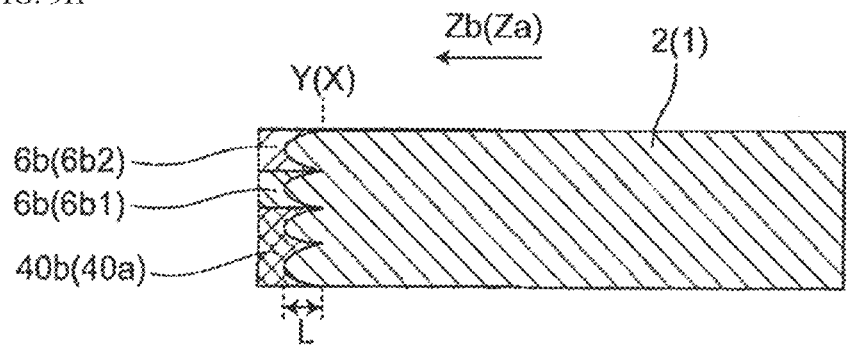
FIG. 9H is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9I:
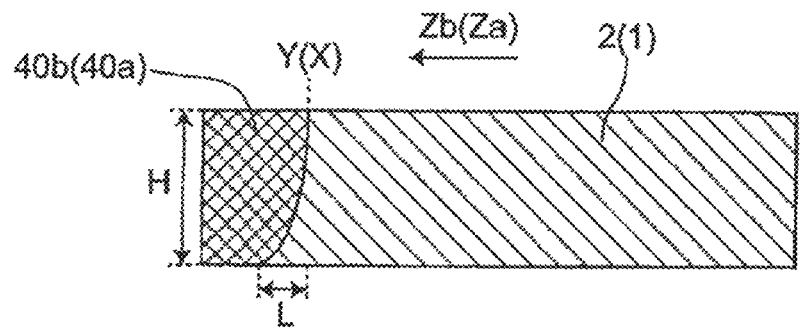
FIG. 9I is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9J:
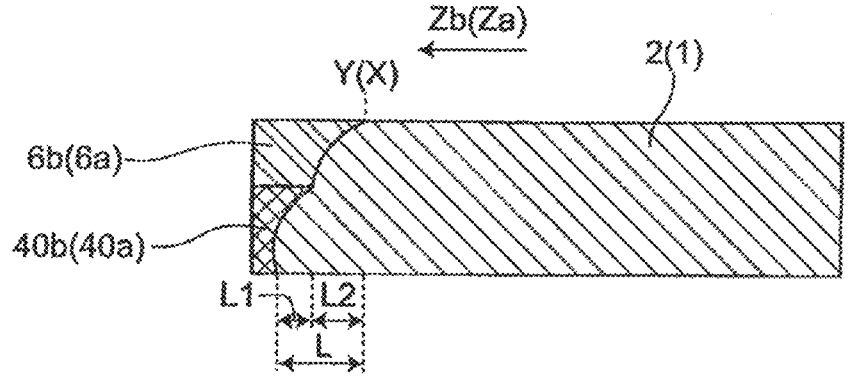
FIG. 9J is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9K:
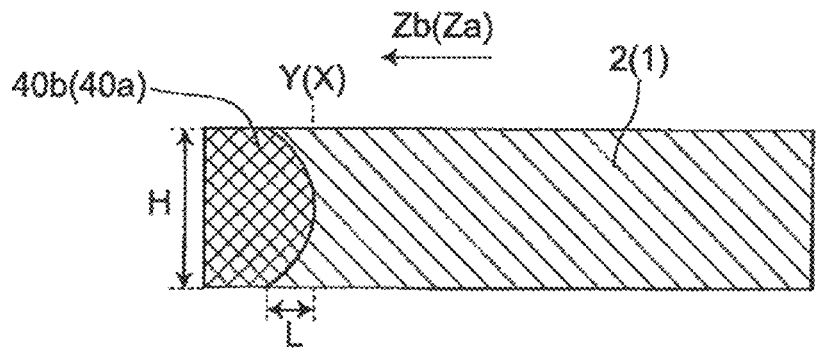
FIG. 9K is an enlarged schematic sectional view of a portion around the end portion protruding structure that may be provided to the end portion of the negative electrode layer (or the positive electrode layer) on the side of the end face electrode in the solid state battery of the present invention.
Figure 9L:
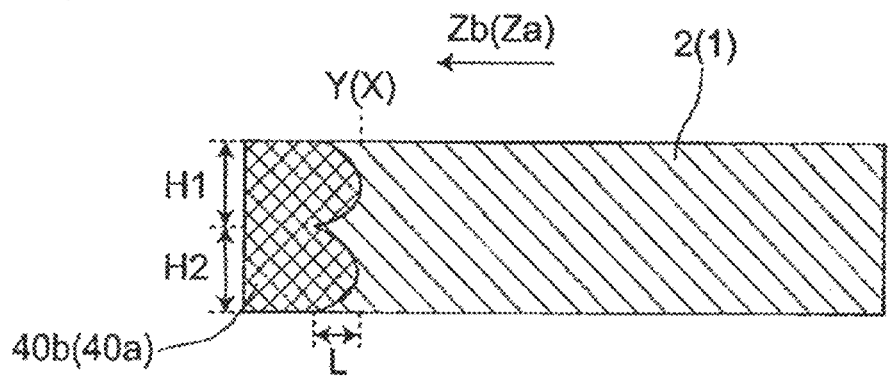
FIG. 9L is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9M:
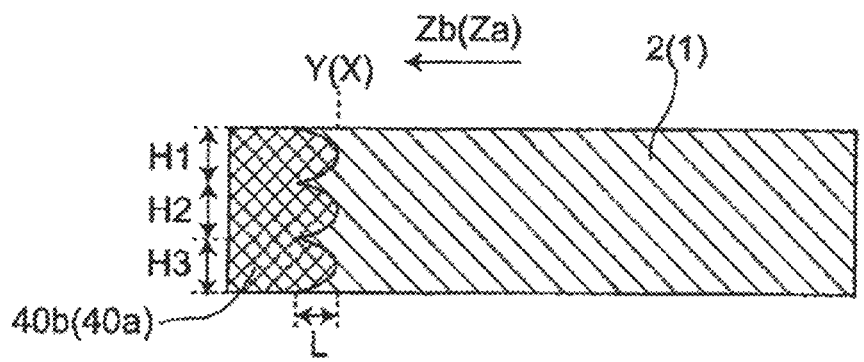
FIG. 9M is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9N:
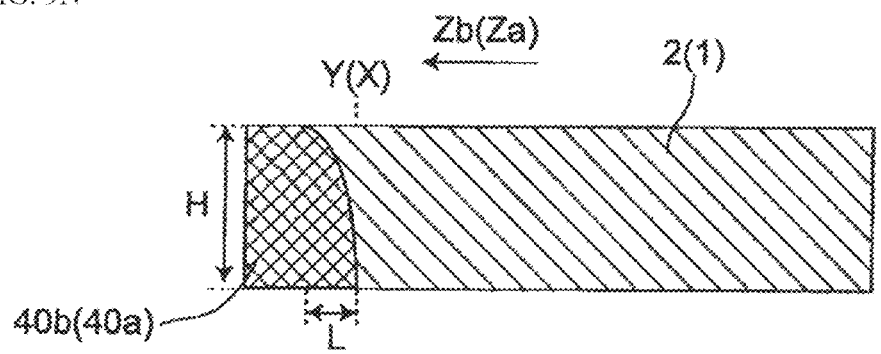
FIG. 9N is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9O:
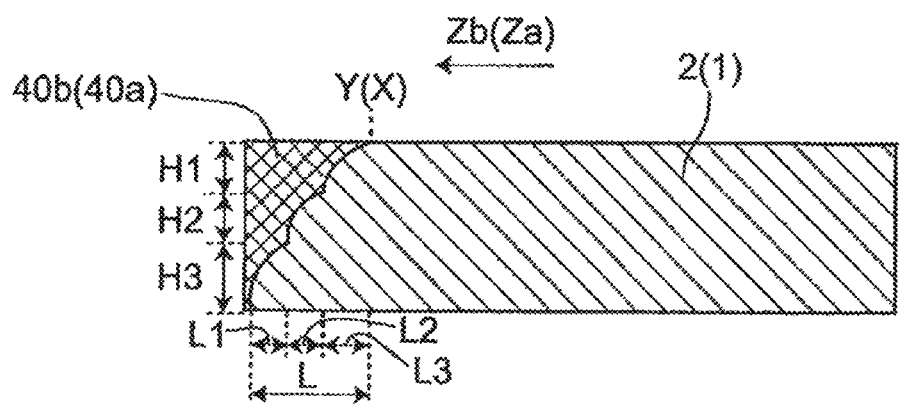
FIG. 9O is an enlarged schematic sectional view of a portion around the negative electrode layer (or the positive electrode layer) for describing an example of the end portion protruding structure that may be provided to the end portion of the negative electrode layer (or the positive electrode layer) on the side of the end face electrode in the solid state battery of the present invention.
Figure 9P:
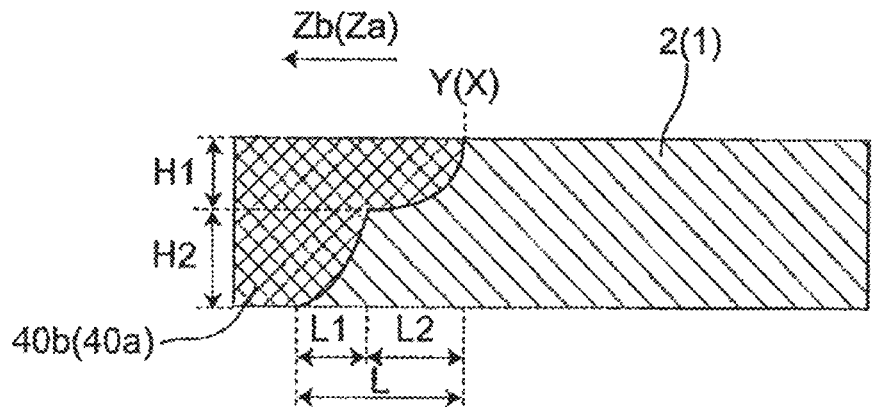
FIG. 9P is an enlarged schematic sectional view of a portion around the end portion protruding structure that may be provided to the end portion of the negative electrode layer (or the positive electrode layer) on the side of the end face electrode in the solid state battery of the present invention.
Figure 10:
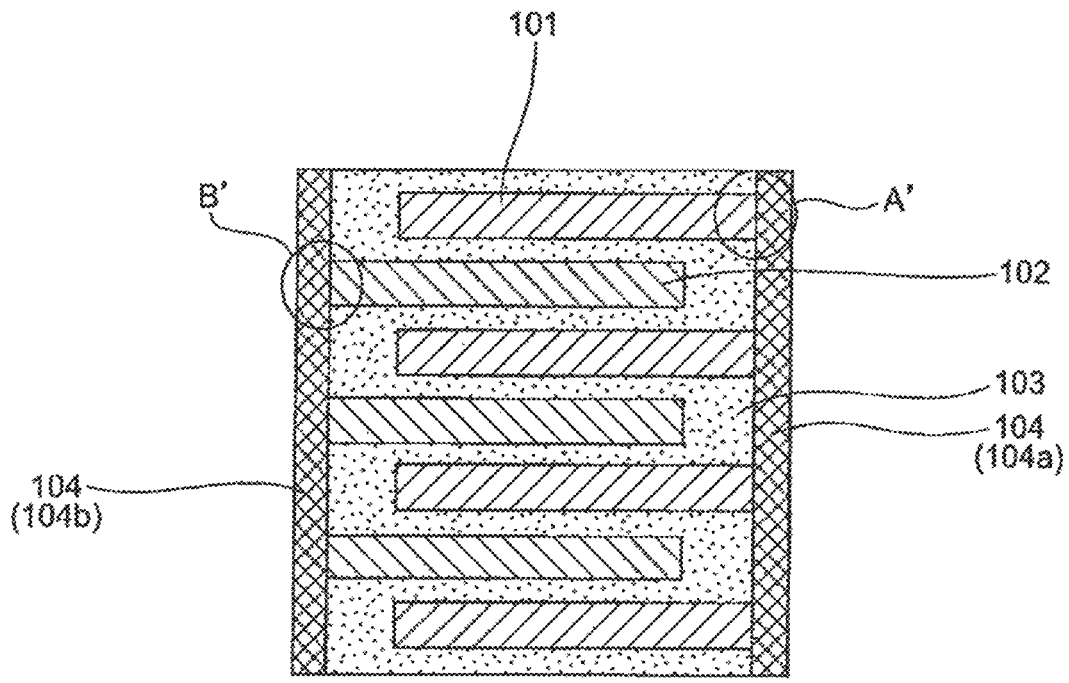
FIG. 10 is a schematic sectional view of an example of a conventional solid state battery.
Figure 11:
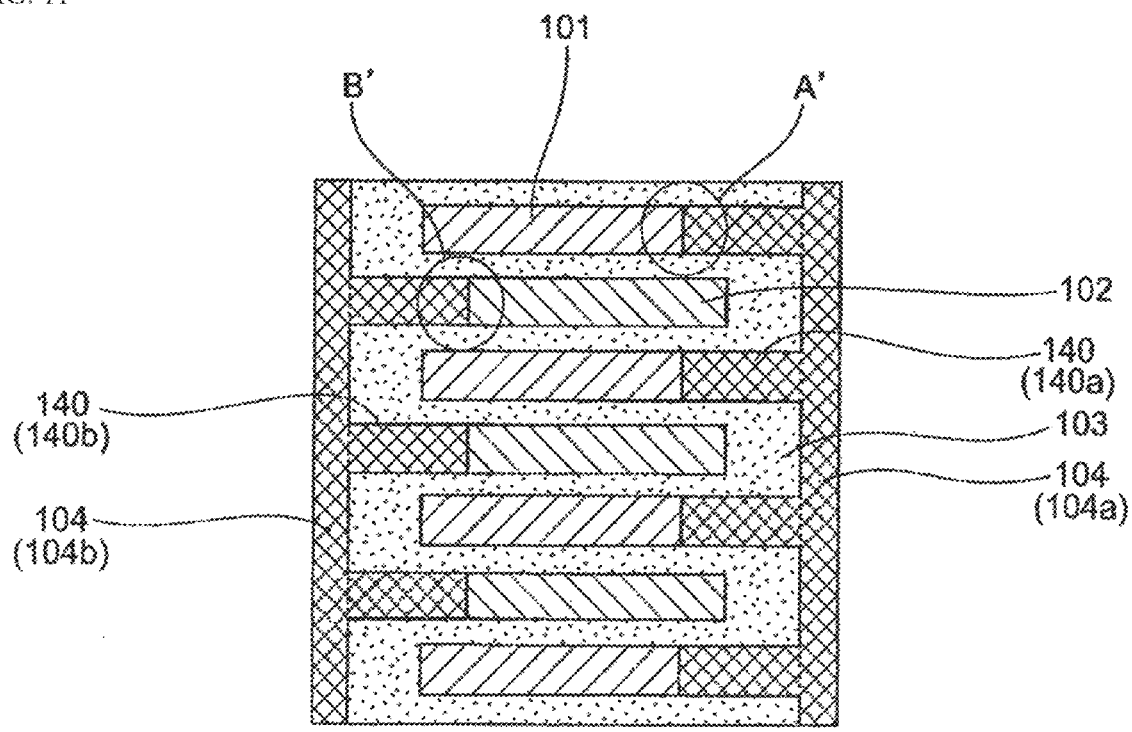
FIG. 11 is a schematic sectional view of an example of a conventional solid state battery.

When the end portion of the electrode layer 1, 2 on the side of the end face electrode is in indirect electrical connection with the end face electrode 4 (4a, 4b) via the joining part 6 (6a, 6b), only one joining part 6b (or 6a) may be used in each electrode layer as illustrated in FIG. 6, FIG. 7B to FIG. 7E, FIG. 7H to FIG. 7K, FIG. 7M to FIG. 7P, FIG. 8C, FIG. 8H, FIG. 8M, FIG. 9G, and FIG. 9J, or two joining parts 6b1 and 6b2 or more may be used in each electrode layer as illustrated in FIG. 8E and FIG. 9H. Specifically, by using two joining parts 6b1 and 6b2 or more in each electrode layer, the joining strength of the electrode layer to the end face electrode (particularly, the joining strength of the electrode layer to the end face electrode via the joining part) can be increased even more.

When two or more joining parts are used in each electrode layer, the two or more joining parts are formed between the end portion of the electrode layer on the side of the end face electrode and the end face electrode, to be arranged in parallel or in series in a direction of movement of electrons (the horizontal direction in the figure for example) as illustrated in FIG. 8E and FIG. 9H. When the two or more joining parts in parallel arrangement include a joining part (one of 6b1 and 6b2 for example) mainly achieving excellent electron conductivity and a joining part (the other one of 6b1 and 6b2 for example) mainly achieving excellent joining performance between the electrode layer and the end face electrode, the effect of improving the joining strength of the electrode layer to the end face electrode (the joining strength of the electrode layer to the end face electrode via the joining part in particular) and the effect of facilitating smoother movement of electrons can be achieved in even more well balanced manner. In this case, the joining part (one of 6b1 and 6b2 for example) mainly achieving excellent electron conductivity includes a joining material and an electron conductive material, and may further include a constituent material of the electrode layer and/or the constituent material of the end face electrode. The joining part (the other one of 6b1 and 6b2 for example) mainly achieving excellent joining performance between the electrode layer and the end face electrode includes a joining material and does not include an electron conductive material. The joining part mainly achieving excellent joining performance between the electrode layer and the end face electrode may further include a constituent material of the electrode layer and/or a constituent material of the end face electrode.

In general, the battery reaction occurs efficiently at the shortest distance between two electrode layers with different polarities facing each other. Therefore, the facing areas of the two electrode layers are preferably large in the lamination direction. To further improve the battery characteristics by securing more sufficient facing areas between the positive electrode layer and the negative electrode layer, the end portion of each electrode layer, on the side of the end face electrode, having the protruding shape is preferably arranged as follows. The end portion of each electrode layer, on the side of the end face electrode, having the protruding shape is preferably arranged outside a region between electrode layers immediately above and below having a polarity different from that of the electrode layer, as illustrated in FIG. 1, for example. For example, the end portion of each negative electrode layer, on the side of the end face electrode, having a protruding shape is preferably arranged outside a region between positive electrode layers immediately above and below. For example, the end portion of each positive electrode layer, on the side of the end face electrode, having a protruding shape is preferably arranged outside a region between negative electrode layers immediately above and below.

In other words, in a plan view (for example, transparent plan view), the end portion of each electrode layer, on the side of the end face electrode, having a protruding shape is preferably arranged in a region not overlapping with electrode layers immediately above and below having a polarity different from that of the electrode layer as illustrated in FIG. 1. For example, in the plan view (for example, transparent plan view), the end portion of each negative electrode layer, on the side of the end face electrode, having a protruding shape is preferably arranged in a region not overlapping with positive electrode layers immediately above and below as illustrated in FIG. 1 for example. For example, in the plan view (for example, transparent plan view), the end portion of each positive electrode layer, on the side of the end face electrode, having a protruding shape is preferably arranged in a region not overlapping with negative electrode layers immediately above and below, as illustrated in FIG. 1 for example.

To further improve the battery characteristics by securing more sufficient facing areas between the positive electrode layer and the negative electrode layer, the joining part 6 of each electrode layer is preferably arranged as follows. The joining part of each electrode layer is preferably arranged outside a region between electrode layers immediately above and below having a polarity different from that of the electrode layer, as illustrated in FIG. 6 for example. For example, the joining part of each negative electrode layer is preferably arranged outside a region between positive electrode layers immediately above and below. For example, the joining part of each positive electrode layer is preferably arranged outside a region between negative electrode layers immediately above and below.

In other words, in the plan view (for example, transparent plan view), the joining part of each electrode layer is preferably arranged in a region not overlapping with electrode layers immediately above and below having a polarity different from that of the electrode layer as illustrated in FIG. 6. For example, in the plan view (for example, transparent plan view), the joining part of each negative electrode layer is preferably arranged in a region not overlapping with positive electrode layers immediately above and below as illustrated in FIG. 6 for example. For example, in the plan view (for example, transparent plan view), the joining part of each positive electrode layer is preferably arranged in a region not overlapping with negative electrode layers immediately above and below as illustrated in FIG. 6 for example.

In the solid state battery 100 of the present invention, to achieve reduction of cost for manufacturing the solid state battery through integral sintering, the electrode layer (the positive electrode layer 1 and the negative electrode layer 2), the solid electrolytic layer 3, and the end face electrode 4 (and the joining part 6) are preferably integrally sintered. In other words, the electrode layer (the positive electrode layer 1 and the negative electrode layer 2), the solid electrolytic layer 3, and the end face electrode 4 (and the joining part 6) are preferably sintered bodies integrally sintered.

Preferably, the end face electrode on the positive electrode side (4a) and the end face electrode on the negative electrode side (4b) have different colors. With this configuration, the end face electrode on the positive electrode side and the end face electrode on the negative electrode side can be easily distinguished when the solid state battery of the present invention is installed, whereby the installation error can be effectively reduced. The end face electrode on the positive electrode side (4a) and the end face electrode on the negative electrode side (4b) can have different colors, by mixing joining material with different colors as the constituent materials of the end face electrodes, or by adding glass or ceramics with different colors and thus coloring the joining materials.

The solid state battery of the present invention may have any shape in the plan view, and generally has a four sided shape. The four sided shape includes a square shape and a rectangular shape.

[Method for Manufacturing Solid State Battery]

The solid state battery 100 of the present invention can be manufactured by a printing method such as a screen printing method, a green sheet method using a green sheet, or a composite method of these. Hereinafter, a case where a printing method is adopted will be described in detail, but it is clear that the method is not limited to the printing method.

The method for manufacturing a solid state battery of the present invention includes a step of forming an unfired laminate by a printing method; and a step of firing the unfired laminate.

(Step of Forming Unfired Laminate)

In this step, using several types of pastes such as a positive electrode layer paste, a negative electrode layer paste, a solid electrolytic layer paste, an end face electrode paste, and the like as inks, an unfired laminate having a predetermined structure is formed on a substrate by a printing method. A joining part paste may be further used. A laminate in which layers and members other than the end face electrodes are laminated may be formed by a printing method, and the end face electrodes may be formed on the end faces of the obtained laminate (that is, a laminated structure) by a coating method such as a dipping method. A part or the entirety of the end face electrodes may be formed by a vapor phase method such as a sputtering method and/or a vapor deposition method.

Each paste can be produced by wet-blending a predetermined constituent material of each layer (member) selected from the group consisting of the above-described positive electrode active material, negative electrode active material, electron conductive material, solid electrolyte material, joining material, and sintering additive with an organic vehicle in which an organic material is dissolved in a solvent.

The organic material contained in the pastes is not particularly limited, and polymer compounds such as polyvinyl acetal resin, cellulose resin, polyacrylic resin, polyurethane resin, polyvinyl acetate resin, polyvinyl alcohol resin, and the like can be used.

The solvent is not particularly limited as long as it can dissolve the organic material, and for example, toluene, ethanol, and the like can be used.

In the wet blending, a medium can be used, and specifically, a ball mill method, a visco mill method, or the like can be used. Alternatively, a wet-blending method that does not use media may be used, and a sand mill method, a high-pressure homogenizer method, a kneader dispersion method, or the like can be used.

The substrate is not particularly limited as long as it can support the unfired laminate, and for example, a polymer material such as polyethylene terephthalate can be used. When the unfired laminate is used for the firing step while being held on the substrate, the substrate used is one having heat resistance to the firing temperature.

In the printing process, printed layers are sequentially laminated with a predetermined thickness and pattern shape, and an unfired laminate corresponding to a predetermined solid state battery structure is formed on the substrate. Specifically, to manufacture the solid state battery 100A illustrated in FIG. 1, for example, a plurality of printed layers are sequentially laminated in a predetermined pattern shape divided in a predetermined thickness from the bottom to the top. In forming each printed layer, a drying process (that is, a solvent evaporation process) is performed.

After forming the unfired laminate, the unfired laminate may be peeled off from the substrate and subjected to the firing step, or the unfired laminate may be subjected to the firing step while being held on the substrate.

(Firing Step)

The unfired laminate is subjected to firing. Firing is carried out by removing the organic material at, for example, 500° C. in a nitrogen gas atmosphere containing oxygen gas, and then heating the laminate at, for example, 550° C. to 1000° C. in a nitrogen gas atmosphere. Firing may generally be performed while pressurizing the unfired laminate in the lamination direction D (in some cases, the lamination direction D and a direction M perpendicular to the lamination direction D). The pressing force is not particularly limited, and may be, for example, 1 kg/cm$^2$ to 1000 kg/cm$^2$, in particular, 5 kg/cm$^2$ to 500 kg/cm$^2$.

The solid state battery according to one embodiment of the present invention can be used in various fields where storage is expected. Non-limiting examples of the applications for which the solid state battery according to one embodiment of the present invention can be used may include electric/IT/communication fields in which mobile devices and the like are used (for example, mobile device fields such as mobile phones, smartphones, smart watches, laptop computers, digital cameras, activity meters, arm computers, electronic paper, and the like), home/small industrial applications (for example, fields of power tools, golf carts, and home/nursing/industrial robots), large industrial applications (for example, fields of forklifts, elevators, and gulf cranes), transportation system field (for example, fields of hybrid vehicles, electric vehicles, buses, trains, electric assisted bicycles, electric motorcycles, and the like), power system applications (for example, fields of various types of power generation, load conditioners, smart grids, general household installation-type power storage systems, and the like), medical applications (medical equipment field such as earphone hearing aids), pharmaceutical applications (fields such as dose management systems), IoT field, space/deep sea applications (for example, fields of space exploration, submersible research vessels, and the like).

DESCRIPTION OF REFERENCE SYMBOLS

1: Positive electrode layer
2: Negative electrode layer
3: Solid electrolytic layer
4: End face electrode
4a: End face electrode on positive electrode side
4b: End face electrode on negative electrode side
6: Joining part
6a: Joining part of positive electrode layer
6b: Joining part of negative electrode layer
40: Complementary shape portion end face electrode 40a: Complementary shape portion end face electrode on positive electrode side
40b: Complementary shape portion end face electrode on negative electrode side
60: Complementary shape portion of joining part
60a: Complementary shape portion of joining part of positive electrode layer
60b: Complementary shape portion of joining part of negative electrode layer
100 (100A, 100B, 100C, 100D, 100E, 100F): Solid state battery

The invention claimed is:

1. A solid state battery comprising:
a laminated structure having one or more positive electrode layers and one or more negative electrode layers alternately laminated with a solid electrolytic layer interposed in between;
a positive end face electrode on a first end face of the laminated structure; and
a negative end face electrode on a second end face of the laminated structure, wherein
(1) at least one of the one or more positive electrode layers has an end portion having a protruding shape protruding toward the positive end face electrode and past a vertical line passing through a farthest point from the positive end face electrode among points on a line defining an end face of the end portion in a sectional view and electrically connected to the positive end face electrode, or
(2) at least one of the one or more negative electrode layers has an end portion having a protruding shape protruding toward the negative end face electrode and past a vertical line passing through a farthest point from the negative end face electrode among points on a line defining an end face of the end portion in the sectional view and electrically connected to the negative end face electrode, and
(3) the end portion of the at least one of the one or more positive electrode layers is indirectly electrically connected to the positive end face electrode via a first joining part, and the first joining part is made of a material different from constituent materials of the at least one of the one or more positive electrode layers and the positive end face electrode, or
(4) the end portion of the at least one of the one or more negative electrode layers is indirectly electrically connected to the negative end face electrode via a second joining part, and the second joining part is made of a material different from constituent materials of the at least one of the one or more negative electrode layers and the negative end face electrode.

2. The solid state battery according to claim 1, wherein the at least one of the one or more positive electrode layers or the at least one of the one or more negative electrode layers has a structure with no current collector member.

3. The solid state battery according to claim 1, wherein (1) the first joining part has a complementary shape portion having a shape that is complementary with respect to the end portion of the at least one of the one or more positive electrode layers in the sectional view, or (2) the second joining part has a complementary shape portion having a shape that is complementary with respect to the end portion of the at least one of the one or more negative electrode layers in the sectional view.

4. The solid state battery according to claim 1, wherein (1) a connection surface between the end portion of the at least one of the one or more positive electrode layers and the first joining part forms a step structure, an inclined structure, a curved structure, or a combination thereof, or (2) a connection surface between the end portion of the at least one of the one or more negative electrode layers and the second joining part forms a step structure, an inclined structure, a curved structure, or a combination thereof.

5. The solid state battery according to claim 1, wherein (1) an end portion of the first joining part on a side of the positive end face electrode has a protruding shape protruding toward the positive end face electrode in the sectional view, and is electrically connected to the positive end face electrode, or (2) an end portion of the second joining part on a side of the negative end face electrode has a protruding shape protruding toward the negative end face electrode in the sectional view, and is electrically connected to the negative end face electrode.

6. The solid state battery according to claim 5, wherein (1) the positive end face electrode has a complementary shape portion having a shape that is complementary with respect to the end portion of the first joining part on the side of the positive end face electrode in the sectional view, or (2) the negative end face electrode has a complementary shape portion having a shape that is complementary with respect to the end portion of the second joining part on the side of the negative end face electrode in the sectional view.

7. The solid state battery according to claim 5, wherein (1) a connection surface between the first joining part and the positive end face electrode forms a step structure, an inclined structure, a curved structure, or a combination thereof, or (2) a connection surface between the second joining part and the negative end face electrode forms a step structure, an inclined structure, a curved structure, or a combination thereof.

8. The solid state battery according to claim 5, wherein (1) the protruding shape of the end portion of the first joining part has a protruding length that is 5 μm to 500 μm, or (2) the protruding shape of the end portion of the second joining part has a protruding length that is 5 μm to 500 μm.

9. The solid state battery according to claim 1, wherein (1) the at least one of the one or more positive electrode layers and the first joining part are integrally sintered bodies, or (2) the at least one of the one or more negative electrode layers and the second joining part are integrally sintered bodies.

10. The solid state battery according to claim 1, wherein (1) the at least one of the one or more positive electrode layers, the first joining part, and the positive end face electrode are integrally sintered bodies, or (2) the at least one of the one or more negative electrode layers, the second joining part, and the negative end face electrode are integrally sintered bodies.

11. The solid state battery according to claim 1, wherein (1) the first joining part includes a mixed material that is a mixture of a material of the at least one of the one or more positive electrode layers and a material of the positive end face electrode, or (1) the second joining part includes a mixed material that is a mixture of a material of the at least one of the one or more negative electrode layers and a material of the negative end face electrode.

12. The solid state battery according to claim 1, wherein (1) an entire end face of the end portion of the at least one of the one or more positive electrode layers is directly electrically connected to the first joining part, or (1) an entire end face of the end portion of the at least one of the one or more negative electrode layers is directly electrically connected to the second joining part.

13. The solid state battery according to claim 1, wherein (1) a first part of an end face of the end portion of the at least one of the one or more positive electrode layers is directly electrically connected to the first joining part and a second part of the end face is directly electrically connected to the positive end face electrode, or (2) a first part of an end face of the end portion of the at least one of the one or more negative electrode layers is directly electrically connected to the second joining part and a second part of the end face is directly electrically connected to the negative end face electrode.

14. The solid state battery according to claim 1, wherein the positive end face electrode and the negative end face electrode have different colors.

\* \* \* \* \*